(12) United States Patent
Strnad et al.

(10) Patent No.: US 12,075,719 B2
(45) Date of Patent: Sep. 3, 2024

(54) REVERSIBLE SEED TRENCH APPURTENANCE ASSEMBLY

(71) Applicant: Precision Planting LLC, Tremont, IL (US)

(72) Inventors: Michael Strnad, Delavan, IL (US); Dale Koch, Tremont, IL (US); Timothy Kater, Bloomington, IL (US)

(73) Assignee: Precision Planting LLC, Tremont, IL (US)

( * ) Notice: Subject to any disclaimer, the term of this patent is extended or adjusted under 35 U.S.C. 154(b) by 803 days.

(21) Appl. No.: 17/274,430

(22) PCT Filed: Sep. 4, 2019

(86) PCT No.: PCT/IB2019/057433
§ 371 (c)(1),
(2) Date: Mar. 8, 2021

(87) PCT Pub. No.: WO2020/049467
PCT Pub. Date: Mar. 12, 2020

(65) Prior Publication Data
US 2022/0046848 A1    Feb. 17, 2022

Related U.S. Application Data

(60) Provisional application No. 62/791,007, filed on Jan. 10, 2019, provisional application No. 62/771,572, (Continued)

(51) Int. Cl.
*A01C 5/06* (2006.01)
*A01C 7/08* (2006.01)

(52) U.S. Cl.
CPC ............... *A01C 5/062* (2013.01); *A01C 7/08* (2013.01)

(58) Field of Classification Search
CPC .................................. A01C 5/062; A01C 7/08
See application file for complete search history.

(56) References Cited

U.S. PATENT DOCUMENTS 4,253,412 A * 3/1981 Hogenson ............... A01C 5/062
111/152
5,092,255 A * 3/1992 Long et al. ............... A01C 7/20
111/167

(Continued)

FOREIGN PATENT DOCUMENTS

| EP | 3 158 844 A1 | 4/2017 |
|---|---|---|
| WO | 2012/129442 A1 | 9/2012 |
| WO | 2016205424 A1 | 12/2016 |

OTHER PUBLICATIONS

European Patent Office, International Search Report for International Application No. PCT/IB2019/057433, mail date Dec. 17, 2019.

*Primary Examiner* — Tara Mayo

(57) ABSTRACT

A reversible seed trench appurtenance for a row unit of an agricultural planter. The seed trench appurtenance includes an upper portion and a trailing portion. The upper portion is received within a mounting bracket attached to the row unit of the planter. The seed trench appurtenance is movable between a normal operating position in which the trailing portion extends into the seed trench. When the row unit is reversed in a direction opposite the forward direction of travel, the seed trench appurtenance moves from the normal operating position to a reversing position in which the trailing portion is vertically above the normal operating position thereby avoiding damage to the seed trench appurtenance and the mounting bracket.

10 Claims, 40 Drawing Sheets

Related U.S. Application Data filed on Nov. 26, 2018, provisional application No. 62/760,925, filed on Nov. 14, 2018, provisional application No. 62/728,740, filed on Sep. 7, 2018.

(56) References Cited

U.S. PATENT DOCUMENTS

| | | | |
|---|---|---|---|
| 6,082,274 A | 7/2000 | Peter | |
| 6,666,156 B1* | 12/2003 | Mayerle et al. | A01C 7/201 |
| | | | 111/150 |
| 8,356,563 B2* | 1/2013 | Schaffert et al. | A01C 5/064 |
| | | | 111/167 |
| 2005/0061219 A1 | 3/2005 | Sauder et al. | |
| 2016/0262304 A1* | 9/2016 | Hagny et al. | A01C 5/068 |
| 2017/0086362 A1* | 3/2017 | Natarjan et al. | A01C 5/068 |

* cited by examiner

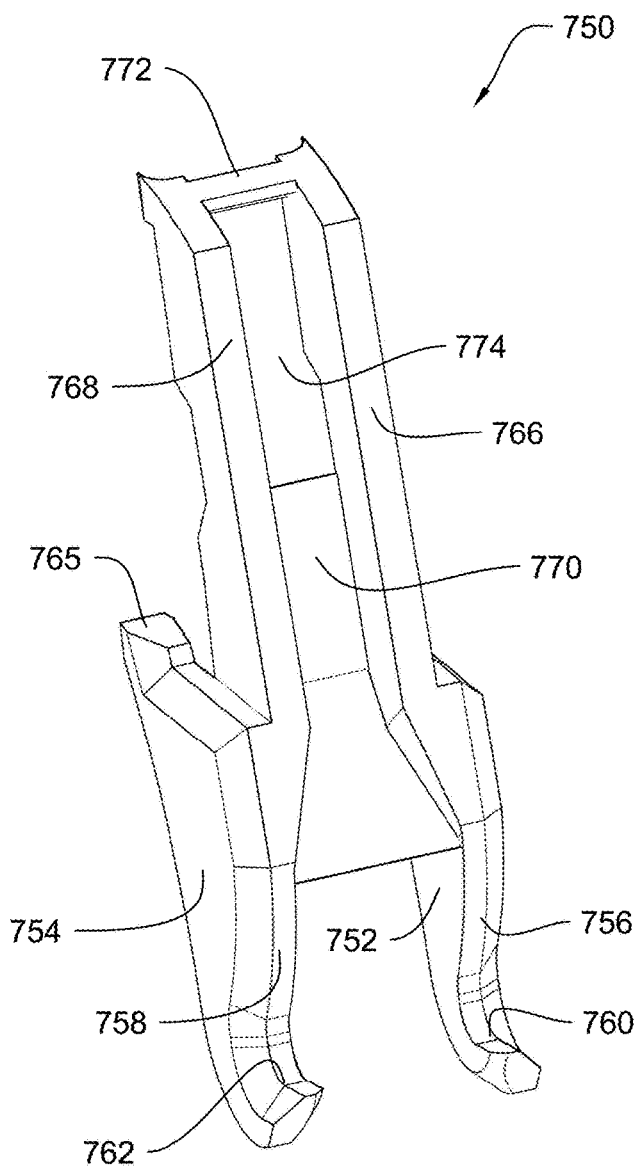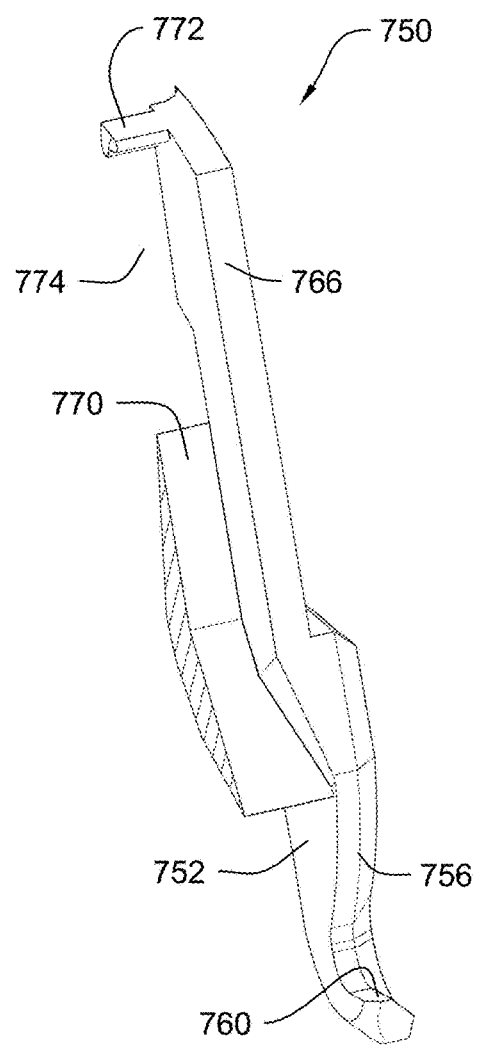
FIG. 25
FIG. 26

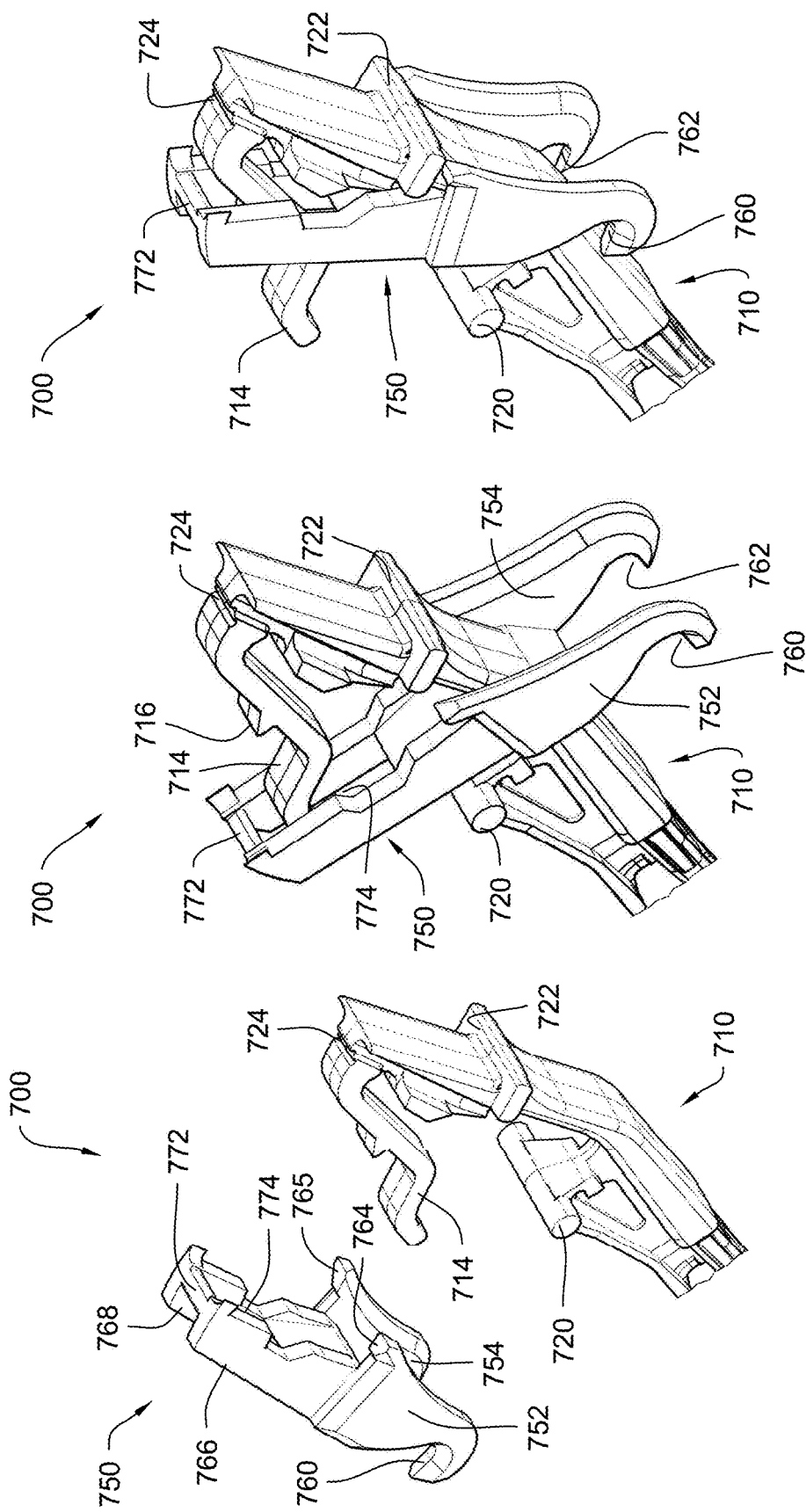

REVERSIBLE SEED TRENCH APPURTENANCE ASSEMBLY

BACKGROUND

Seed trench appurtenances, such as seed firmers, seed rebounders, seed deflectors, and the like, are well known in the art. Seed rebounders or seed deflectors are intended to prevent or minimize seed roll or seed bounce as the seeds are deposited in the seed trench. Seed firmers are configured to engage the seeds to press or "firm" the seeds into the bottom of the seed trench to ensure good seed-to-soil contact and promoting better seed germination. Such seed trench appurtenances are typically mounted by a bracket attached to the shank of the planter or to the seed tube with the distal end of the firmer positioned in the bottom of the seed trench rearward of the seed tube so as to pass over the seeds after the seeds are deposited in the seed trench.

During planting operations, it is sometimes necessary to reverse the planter. Usually the operator will raise the row units out of the ground before reversing, but an operator may occasionally forget to do so resulting in the seed trench appurtenance digging into the soil as the planter is reversed and causing the appurtenance or the brackets holding the appurtenance to bend or break.

Accordingly, there is a need in the industry for seed firmers and other seed trench appurtenances to be mounted or otherwise adapted so that if the planter is reversed without first raising the row units above the soil, the seed trench appurtenance or the bracket holding the seed trench appurtenance will not be damaged.

BRIEF DESCRIPTION OF THE DRAWINGS

FIG. 2A is an exploded view of the prior art mounting bracket of FIG. 2.

FIG. 25 is an rear perspective view of the coupling member of FIG. 24.

FIG. 26 is the same view of the coupling member of FIG. 25 in cross-section.

FIGS. 27A-27E are front perspective views showing the coupling of the seed trench appurtenance with the coupling member.

DESCRIPTION

Figure 1:
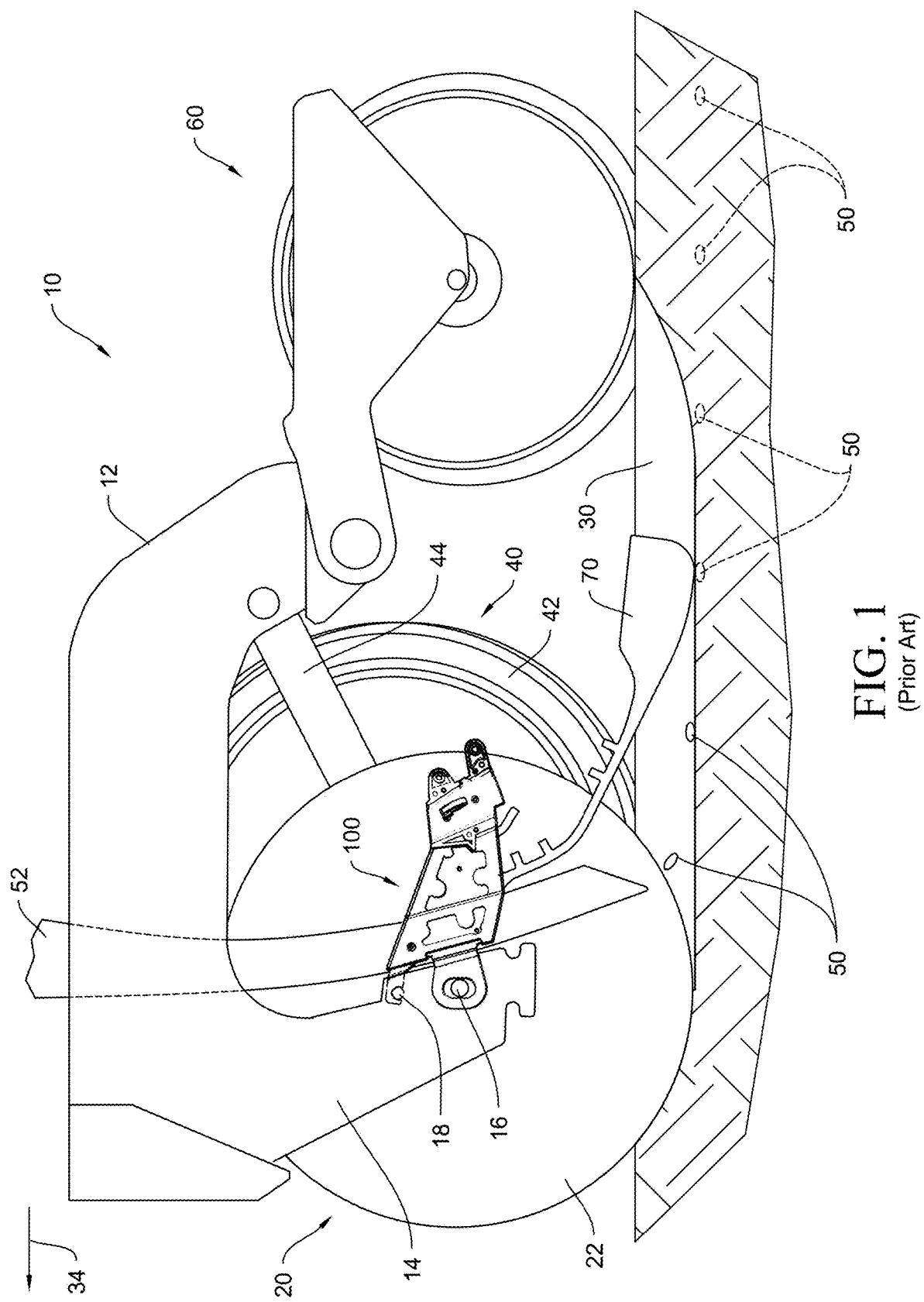
FIG. 1 is a side elevation view of a planter row unit showing a prior art seed firmer and mounting bracket that is not reversible and may be damaged if the planter is reversed without fully raising the row units above the soil.

Referring to the drawings, wherein like reference numerals designate identical or corresponding parts throughout the several views, FIG. 1 illustrates a row unit 10 of a conventional row planter. The row unit 10 includes a frame 12 supporting an opening disc assembly 20. The opening disc assembly 20 may include a pair of angled opening discs 22 (one of the opening discs 22 has been removed for clarity). The opening discs 22 are rollingly mounted to a downwardly extending shank 14 of the frame 12 and disposed to open a v-shaped seed trench 30 in a soil surface 32 as the row unit advances in a forward direction of travel through a field as indicated by arrow 34. The row unit 10 may include a gauge wheel assembly 40 comprising a pair of gauge wheels 42 each pivotally mounted to one side of the frame 12 by a respective gauge wheel arm 44 (one of the pair of gauge wheels 42 and its gauge wheel arm 44 is removed for clarity). As is conventional, a depth adjustment assembly (not shown) may be provided to contact the gauge wheel arms 44 to limit the upward travel of the gauge wheel arms 44 with respect to the opening discs 22, thus limiting the depth of the seed trench 30 opened by the opening disc assembly 20. Also as is convention, the row unit 10 may support a seed meter (not shown) and a seed hopper (not shown). In operation, seeds 50 are communicated from the seed hopper to the seed meter. The seed meter singulates the seeds 50 and discharges the singulated seeds into a seed tube 52 supported by the frame 14. Rather than a seed tube, a seed conveyor (not shown) may receive the seeds discharged by the seed meter. The seed meter may be a vacuum-type meter such as that disclosed in International Patent Publication No. WO2012/129442. The seed tube 52 (or seed conveyor) directs the seeds 50 downwardly and rearwardly toward the seed trench 30. The seeds 50 are released the discharge end of the seed tube 52 (or seed conveyor) and are deposited in the open seed trench 30. A closing assembly 60 may be pivotally coupled to the frame 14 and configured to "close" the seed trench 30 by move soil back into the open seed trench 30 over the deposited seeds.

Continuing to refer to FIG. 1, the row unit 10 includes a mounting bracket 100 which supports a seed firmer 70. An example of a mounting bracket 100 is Part No. 150111 available from Precision Planting LLC, 23333 Townline Road, Tremont, IL 61568. Examples of a seed firmers include the Keeton® seed firmer and the SmartFirmer™, also available from Precision Planting LLC.

Figure 2:
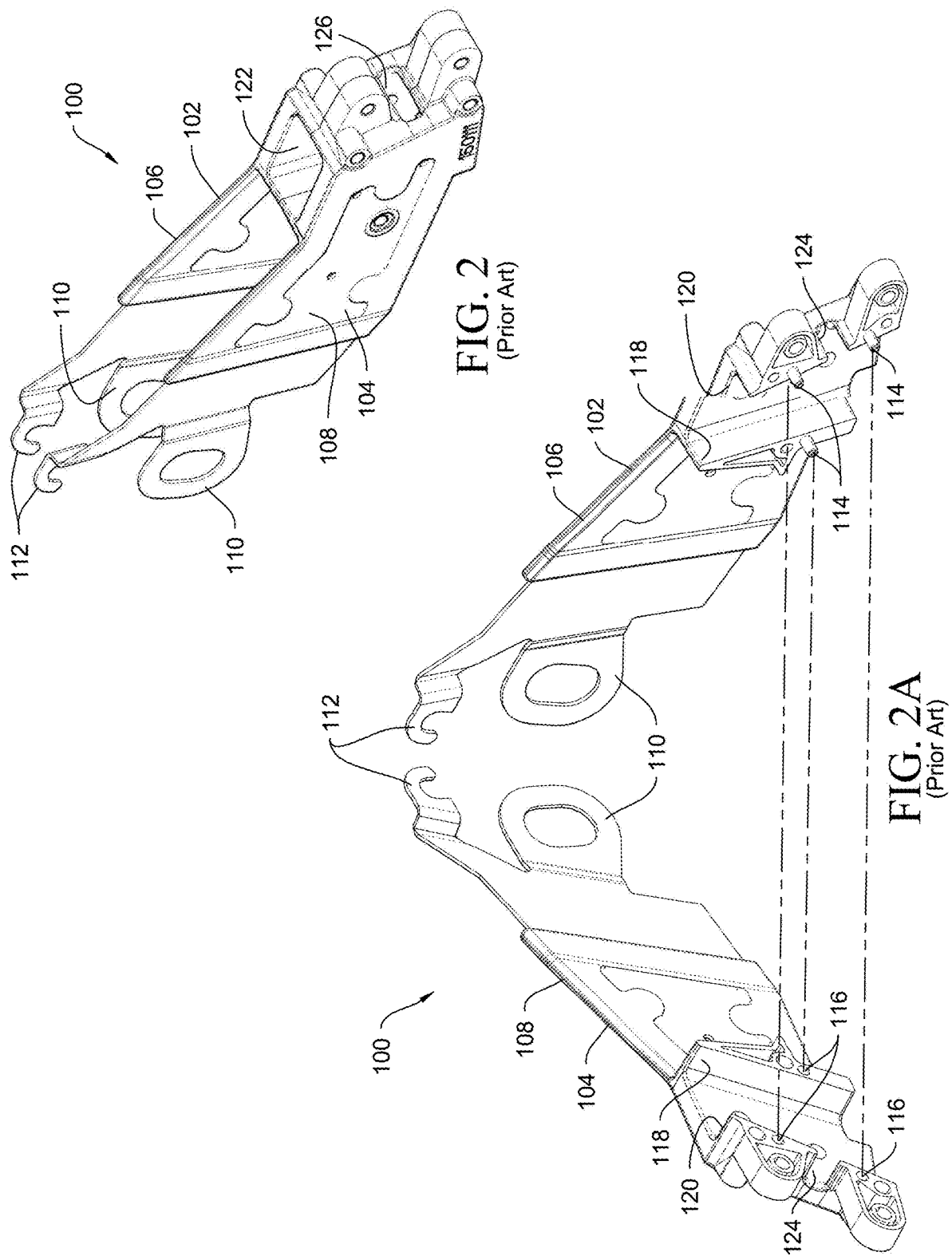
FIG. 2 is a rear perspective view of the prior art mounting bracket shown in FIG. 1.
Figure 3:
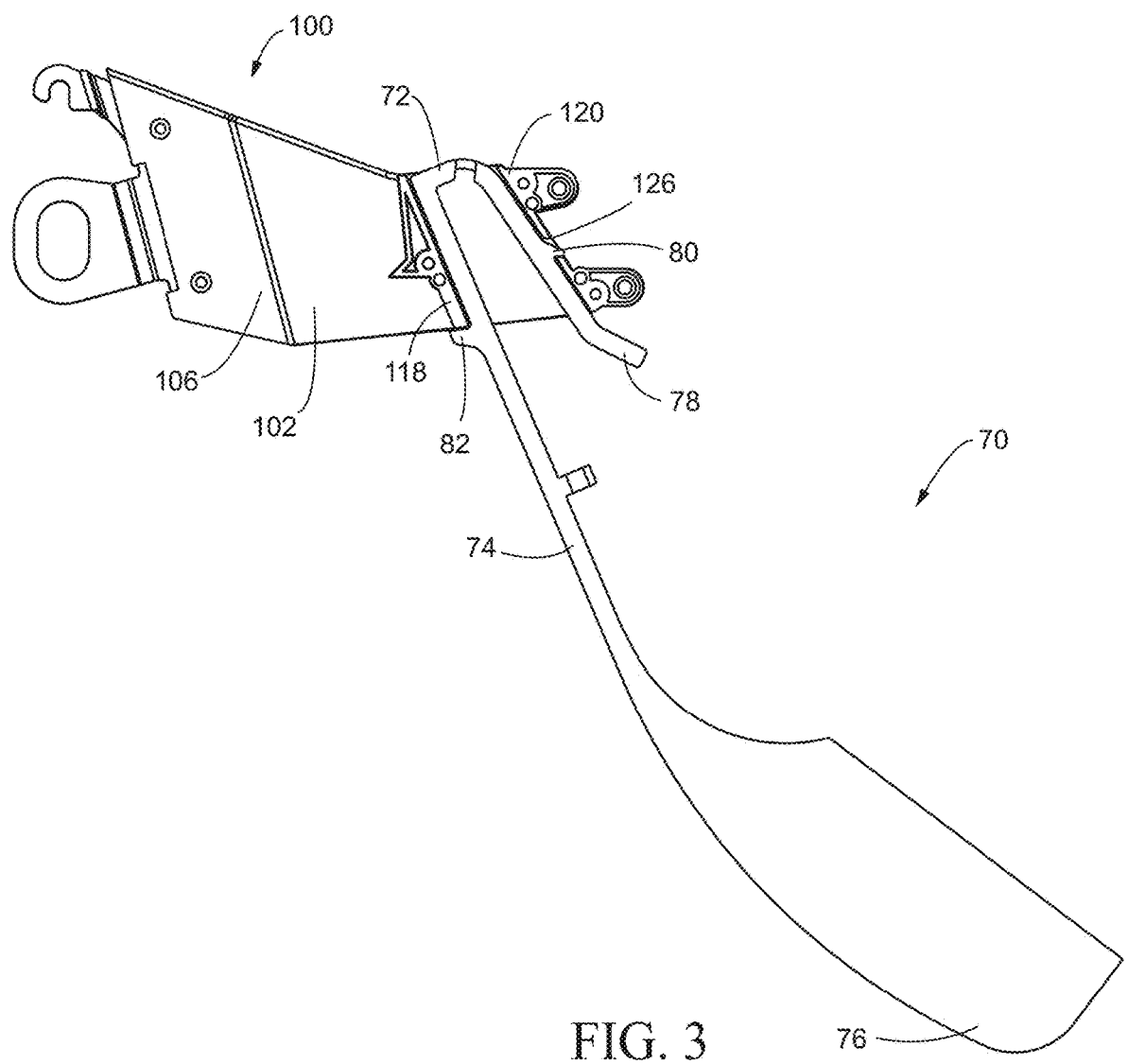
FIG. 3 is an enlarged side elevation view of the prior art seed firmer and mounting bracket shown in FIG. 1, with one side of the mounting bracket removed to show how the seed firmer is attached to the mounting bracket.
Figure 4:
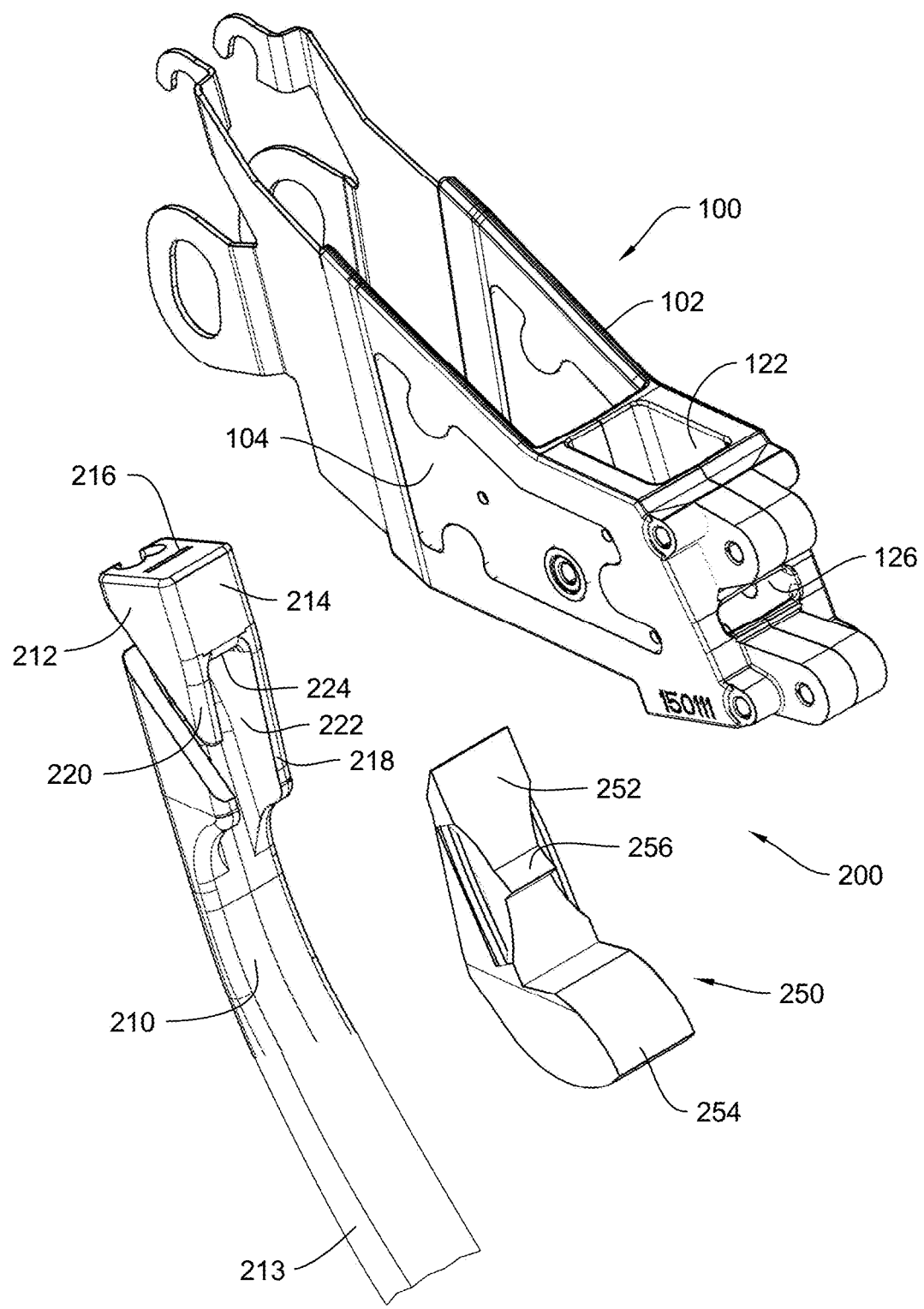
FIG. 4 is an exploded rear perspective view of the components of one embodiment of a reversible seed trench appurtenance.

FIG. 2 is an enlarged perspective view of the mounting bracket 100 shown in FIG. 1. The mounting bracket 100 includes left and right mating halves 102, 104 as best seen in the exploded view of FIG. 2A. Each half 102, 104 includes a respective sidewall 106, 108 which extends forwardly. The forward end of each sidewall 106, 108 includes a mounting ear 110 and a hook member 112. The mounting ear 110 is sized to receive a pin 16 (FIG. 1) extending from each side of the shank 14 of the frame 12. The hook member 112 also engages with a pin 18 (FIG. 1) on the shank 18. It should be appreciated that the engagement of the mounting ear 110 and hook member 112 with the respective pins 16, 18 on the shank 14 rigidly secure the mounting bracket 100 with respect to the shank 14. The rearward ends of each half 102, 104 are secured together by pegs 114 received within matingly aligned apertures 116. As shown in FIGS. 2 and 2A, each half 102, 104 also includes inwardly projecting, longitudinally spaced forward and rearward flanges 118, 120 which matingly align, such that when assembled, the mating flanges 118, 120 define a through-opening 122 (FIG. 2) for receiving the upper portion of the firmer 70 as best illustrated in FIG. 3. Each of the rearward flanges 120 includes a slotted portion 124, which together define a transverse slot 126 when the halves 102, 104 are assembled. As discussed later, the transverse slot 126 receives the rearwardly projecting tab 80 of the resilient arm 78 of the seed firmer 70 while the bottom end of the forward flange 118 engages with the forwardly extending lip 82 on the firmer 70. The inwardly projecting flanges 118, 120 also serve as spacers between the sidewalls 106, 108 for receiving the seed tube 52 (or seed conveyor) therebetween as shown in FIG. 1. Thus the sidewalls 106, 108 surround the seed tube 52 (or seed conveyor) permitting independent movement of the seed tube 52 (or seed conveyor) with respect to the mounting bracket 100.

Referring to FIG. 3, the seed firmer 70 may be made from a wear resistant, plastic material, such as ultra-high molecular weight polyethylene (UHMW). The firmer 70 has an upper portion 72, a rearwardly extending resilient neck portion 74, and a rigid tail end 76. Although the firmer is made of the same material throughout, the tail end 76 is rigid compared to the neck portion 74 due to its greater section modulus. The upper portion 72 of the firmer 70 includes a downturned, resilient arm 78 having a rearwardly projecting tab 80. The forward side of the resilient neck portion 74 includes a forwardly projecting lip 82. The upper portion 72 of the firmer with the downturned resilient arm 78 is received within the through-opening 122 of the bracket 100. It should be appreciated that the upper portion 72 of the firmer 70 is securely retained within the bracket 100 due to the downturned resilient arm 78 being biased within the through-opening 122 such that the tab 80 is biased within the transverse slot 126 with the lip 82 engaged with the bottom end of the forward wall 118 of the bracket 100. However, the upper portion 72 of the seed firmer 70 may be easily removed from the bracket by squeezing the resilient arm 78 toward the neck portion 74, such that tab 80 disengages from the transverse slot 126 in the bracket 100 allowing the upper portion 72 to be removed from the through-opening 122 by pulling downward on the firmer 70.

In operation, with the upper portion 72 of the firmer 70 received within the mounting bracket 100, the tail end 76 trails directly behind the seed tube 52 (or conveyor) such that it is disposed in the bottom of the seed trench 30. The resilient neck portion 74 slightly flexes biasing the rigid tail end 76 within the bottom of the seed trench 30. As the row unit 10 advances in the forward direction of travel as indicated by arrow 34 (FIG. 1), the downward bias provided by the resilient neck portion 74 causes the rigid tail end 76 to press or "firm" the seeds 50 into the bottom of the seed trench as shown in FIG. 1 to ensure good seed-to-soil contact promoting better seed germination. As is well known, the seed firmer 70 may support liquid delivery tubes (not shown) for communicating liquid fertilizer or other liquid products from a fluid source (not shown) onto the seeds 50 or adjacent to the seeds 50 within the seeds trench 30.

While the above described firmer and bracket configuration serve their intended purposes very well, as previously discussed, operators may occasionally forget to raise the row units out of the ground before reversing the planter, or the operator may not wait for the hydraulic system to fully raise the planter before beginning to reverse. If that occurs, the seed trench appurtenance may dig into the soil as the planter is reversed causing the appurtenance or the brackets holding the appurtenance to bend or break. Therefore, it is desirable to provide a reversible seed trench appurtenance assembly that will not be damaged if the planter is reversed without first raising the row units 10 above the soil.

One embodiment of a reversible seed trench appurtenance assembly is shown in FIGS. 4-8, designated generally by reference number 200. The assembly 200 includes a seed trench appurtenance 210 having an upper portion 212 and a trailing portion 213. The upper portion 212 is received within the mounting bracket 100 as described below. The trailing portion 213 of the seed trench appurtenance 210 may be any desired configuration of a seed firmer, seed rebounder or seed deflector that extends into the seed trench. Thus, since the trailing portion 713 of the seed trench appurtenance may vary, only the upper portion of the seed trench appurtenance 210 is shown in FIGS. 4-8.

Figure 5:
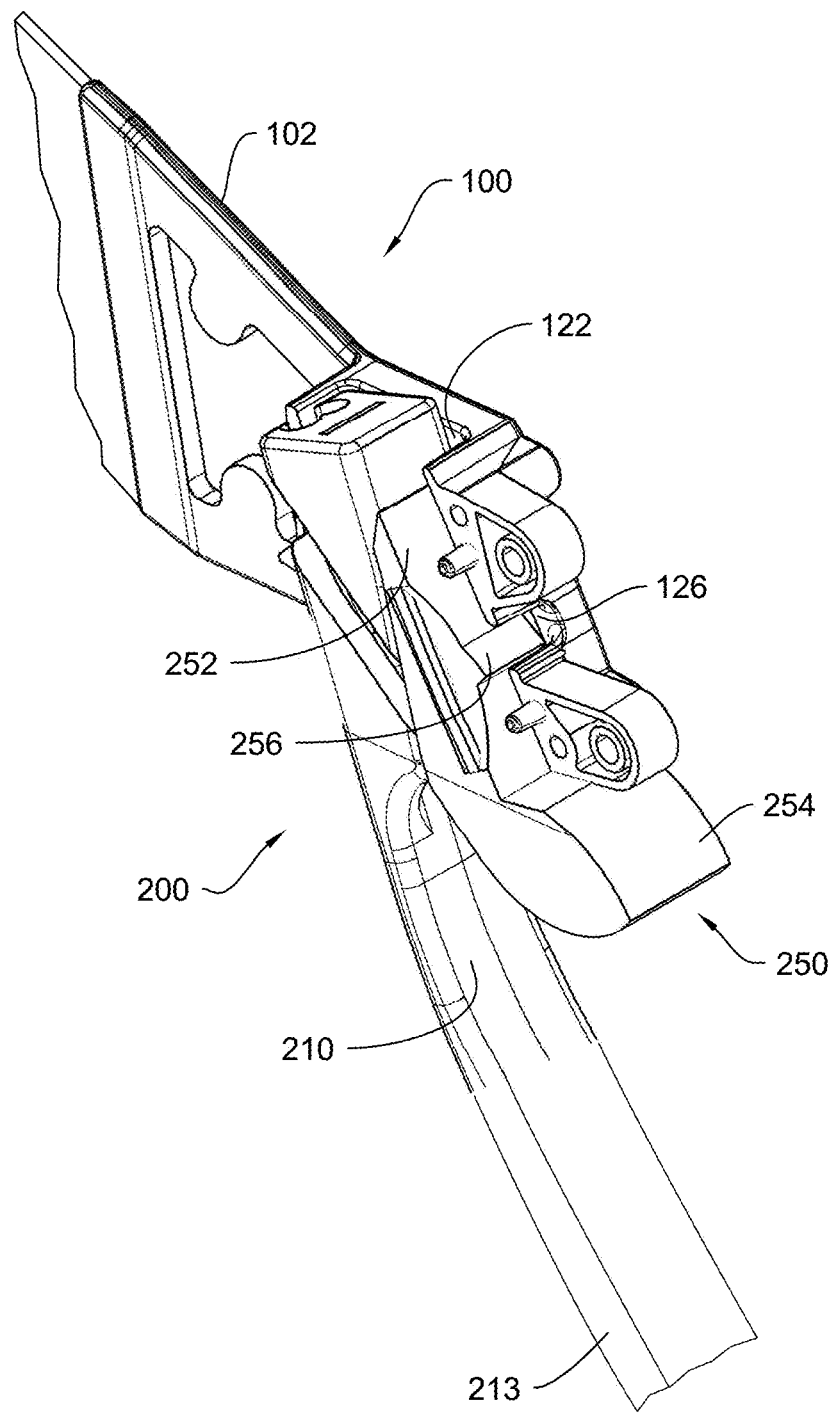
FIG. 5 is a rear perspective view of the assembled reversible seed trench appurtenance of FIG. 4, but with one side of the mounting bracket removed for clarity.
Figure 6:
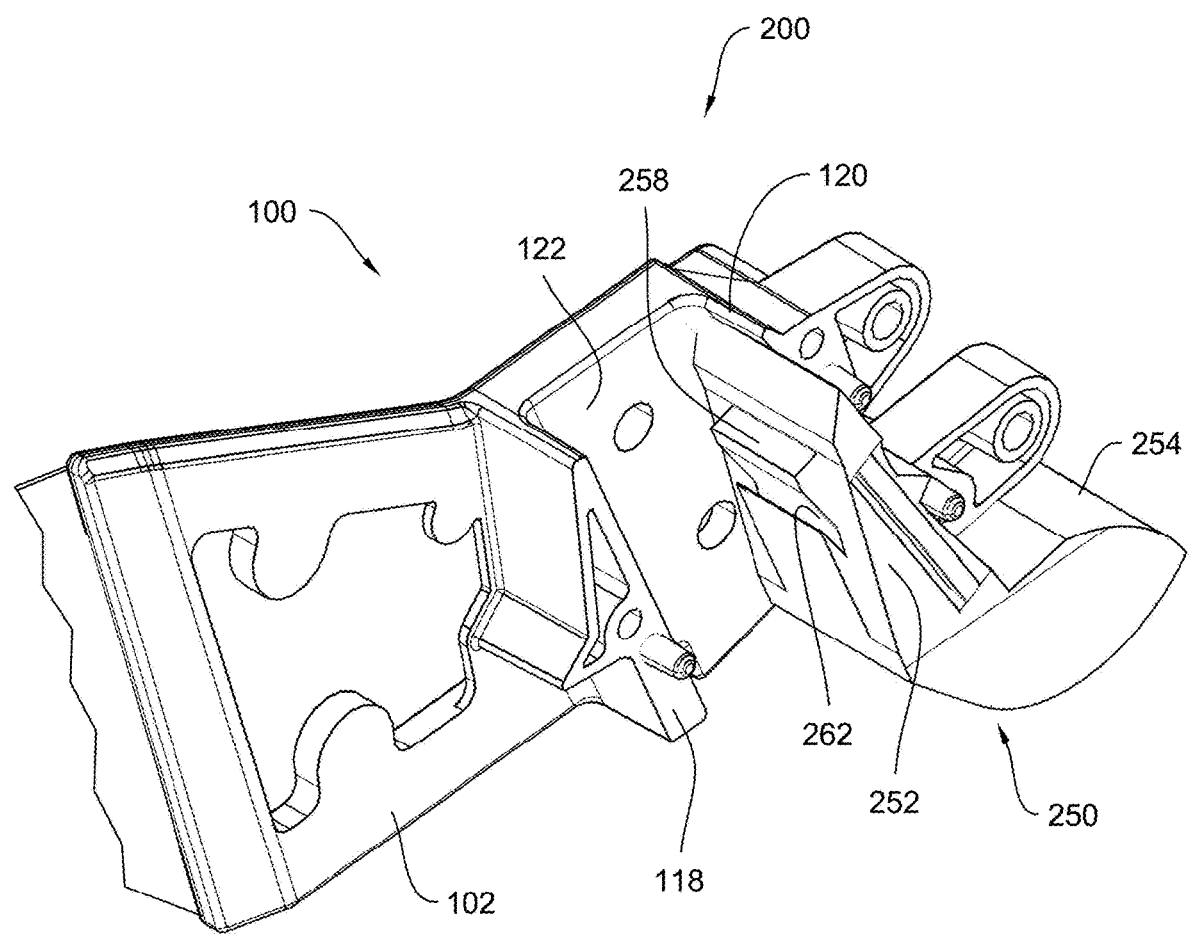
FIG. 6 is a partially assembled front perspective view of FIG. 4 with the wedge member positioned within the mounting bracket, but with the seed trench appurtenance removed or not yet inserted into the mounting bracket.
Figure 8:
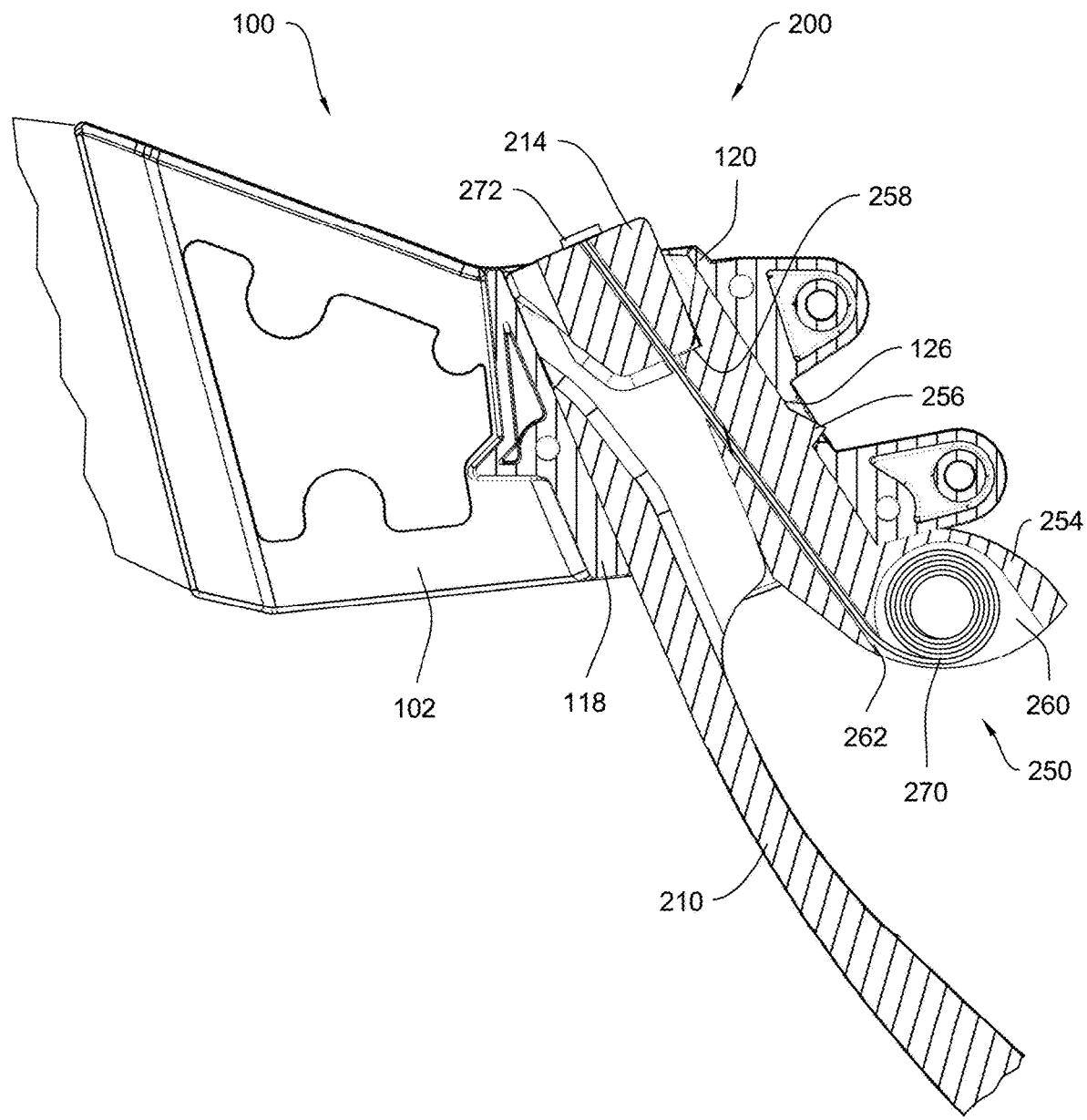
FIG. 8 is a cross-sectional view of the assemble reversible seed trench appurtenance of FIG. 5 as viewed along lines A-A of FIG. 5 in the normal operating position.
Figure 8A:
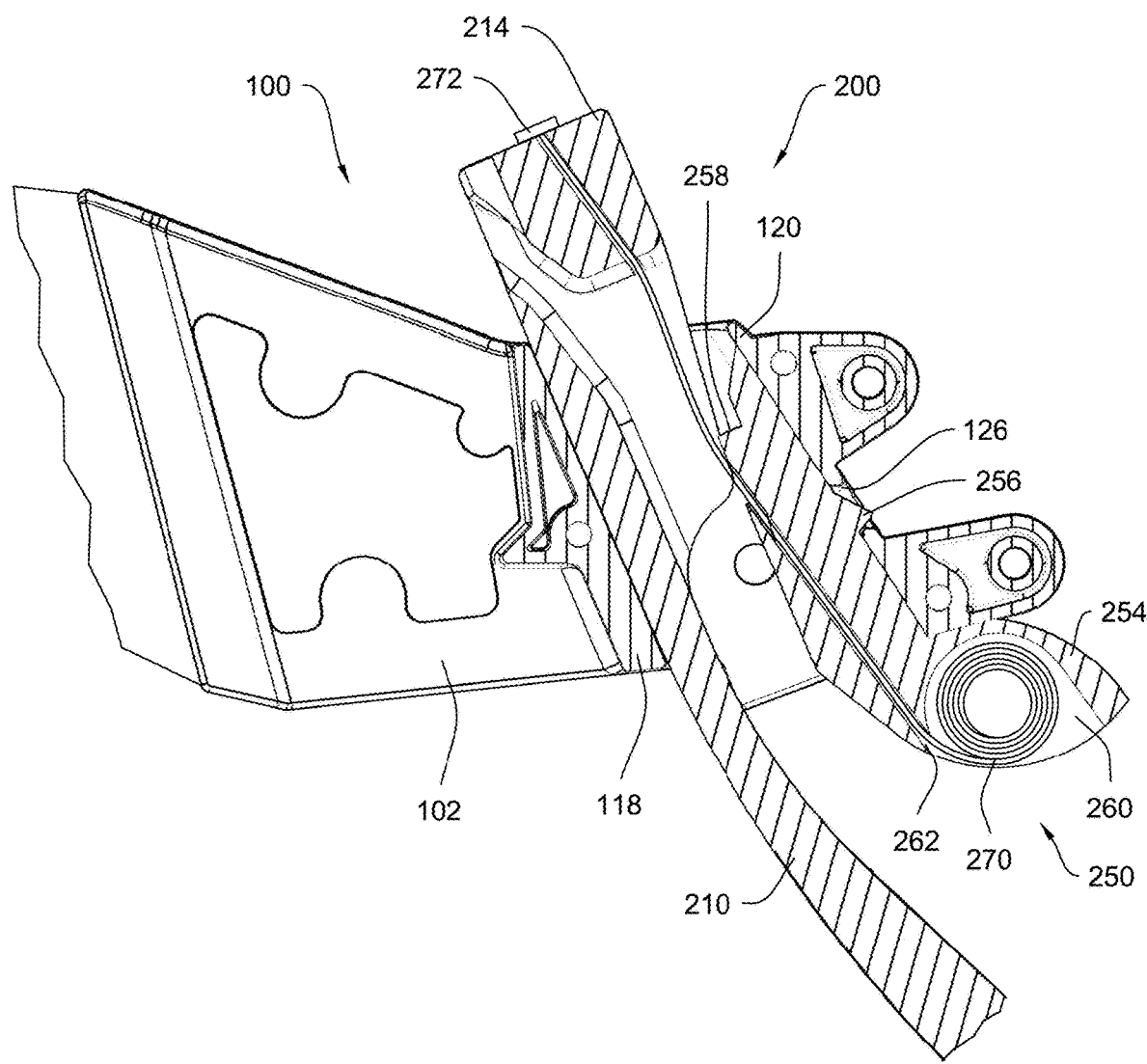
FIG. 8A is the same cross-sectional view as FIG. 8 but showing how the seed trench appurtenance is able to move upward with respect to the mounting bracket to avoid damage in the event the planter is reversed without lifting the row unit.
Figure 9:
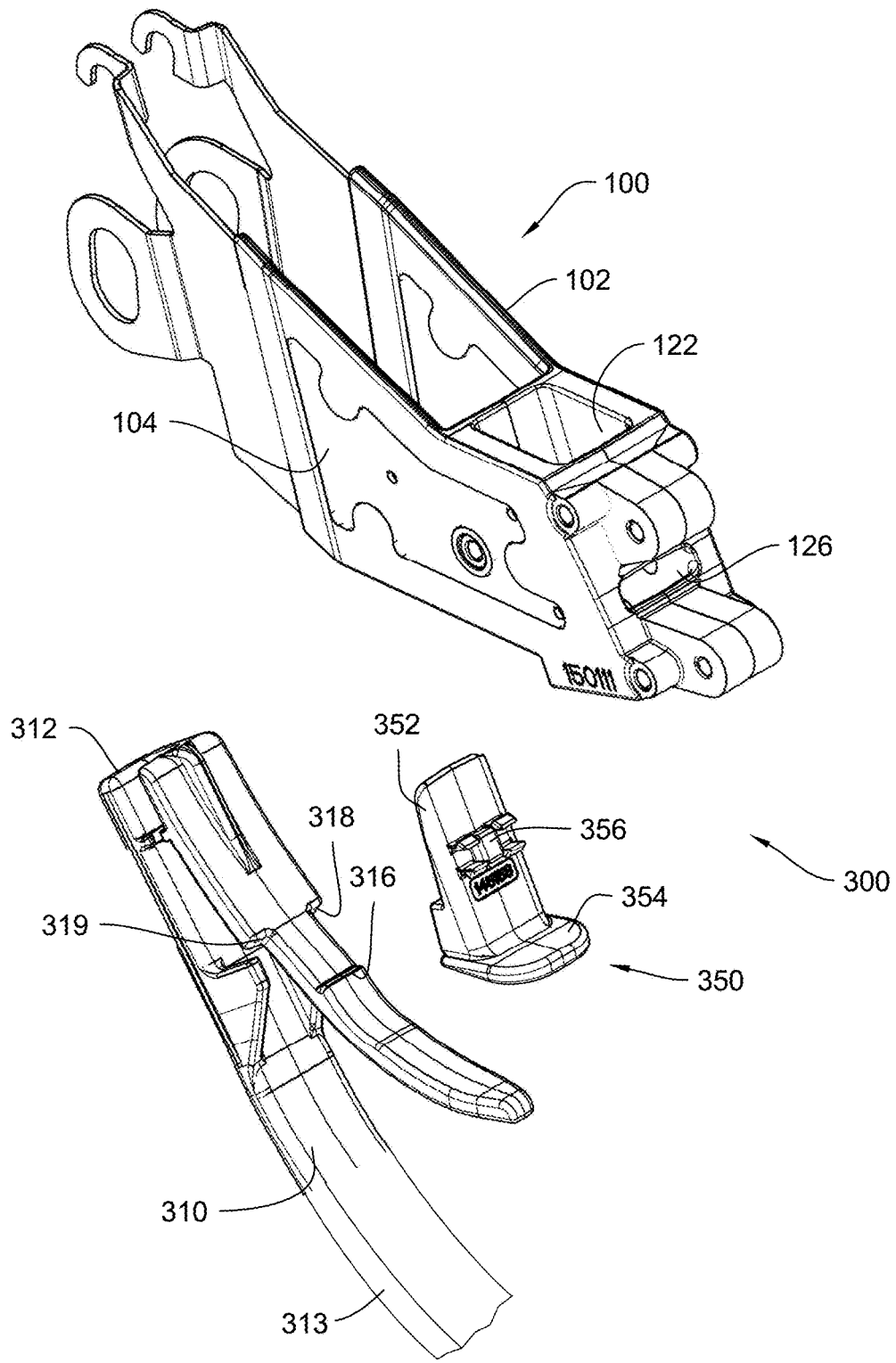
FIG. 9 is an exploded rear perspective view of the components of another embodiment of a reversible seed trench appurtenance.

The upper portion 212 of the seed trench appurtenance 210 is configured to be received within the through opening 122 of the bracket 100 along with a portion of a wedge member 250. The wedge member 250 cooperates with upper portion 212 to secure the upper portion 212 within the bracket 100 during normal operation as shown in FIGS. 5 and 8 (i.e., when the planter is moving in the forward direction of travel 34 (FIG. 1)), but permits the appurtenance 210 to move upwardly relative to the bracket 100 as shown in FIG. 8A in the event the planter is reversed without first raising the row unit 10 completely above the soil.

Figure 7:
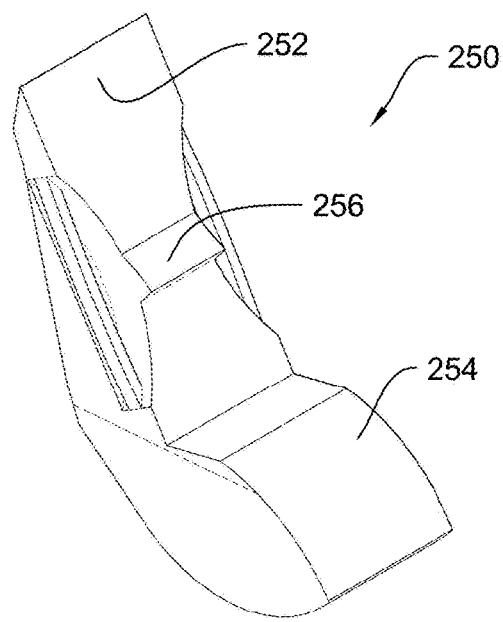
FIG. 7 is a rear perspective view showing the wedge member of FIG. 4
Figure 7B:
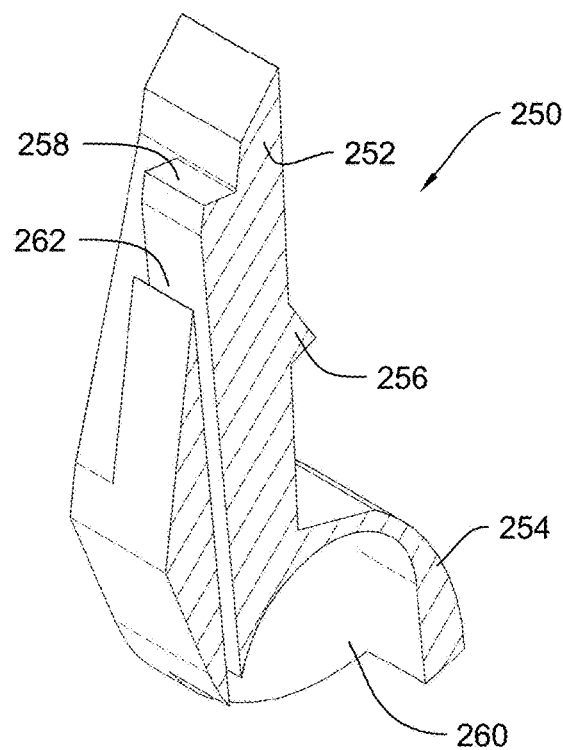
FIG. 7B is a cross-sectional view of the wedge member of FIG. 7.
Figure 7A:
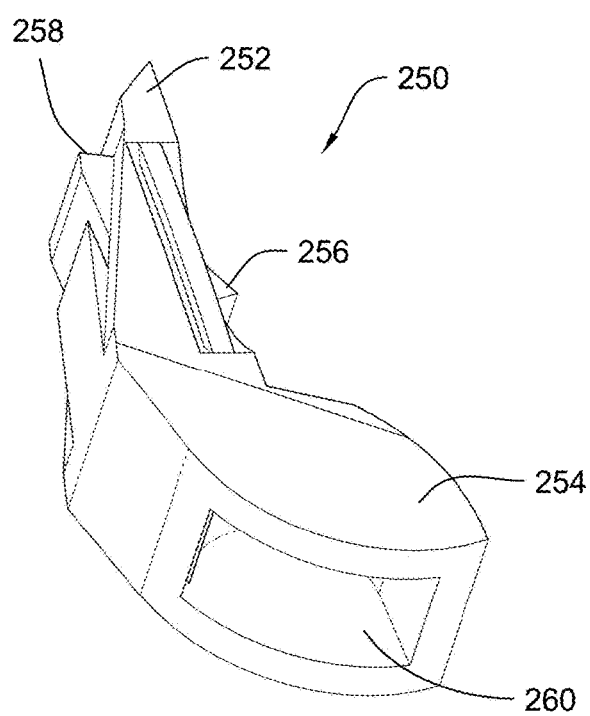
FIG. 7A is a bottom perspective of the wedge member of FIG. 7.

As best viewed in FIGS. 7, 7A and 7B, the wedge member 250 includes an upper wedge shaped portion 252 and a bulbous lower flange 254. The rearward face of the upper wedge shaped portion includes a rearwardly projecting tab 256. The forward side of the wedge member 250 includes a forward shelf 258. As best shown in FIGS. 7A and 7B, the underside of the bulbous flange 254 includes a cavity 260 and a vertical passage 262 extending through the wedge shaped portion 252.

The upper portion 212 of the appurtenance 210 includes a head 214 with a vertical passage 216. Below the head 214 are rearwardly projecting flanges 218, 220 defining a channel 222 with an upper end 224.

When assembling the reversible seed trench appurtenance assembly 200, the upper portion of the wedge member 250 is first insert into the through-opening 122 from below the bracket 100. The seed trench appurtenance 210 is then inserted into the through-opening 122 forward of the of the bracket 100. The appurtenance 210 and the wedge member 250 are then pushed upwardly together further into the through-opening 122 until the rearward projecting tab 256 seats into the transverse slot 126 with bulbous flange 254 abutting the bottom of the bracket 100 (see FIGS. 8 and 8A). The seed trench appurtenance 210 is then pulled downward into its normal operating position, wherein the forward shelf 258 of the wedge member 250 is received in the channel 222 and the forward shelf 258 abutting the upper end 224 of the channel 222 preventing the appurtenance 210 from sliding down within the through-opening 122. However, as shown in FIG. 8A, the appurtenance 210 is able to move upwardly within the through-opening 122 with respect to the stationary wedge member 250.

A constant force coil spring 270 is coiled within the cavity 260 of the bulbous flange 254 with a free end of the coil spring 270 extending through the vertical passage 262 of the wedge shaped portion 252 and through the vertical passage 216 in the head 214 of the appurtenance 210. The free end of the constant force coil spring 270 is secured to the head 214 of the appurtenance by a clip 272. As shown in FIGS. 8 and 8A, it should be appreciated that the constant force coil spring 270 biases the appurtenance 210 downwardly such that the upper end 224 of the channel 222 abuts the forward shelf 258 thus maintaining the appurtenance 210 in the normal operating position. However, if the planter is reversed without first raising the row unit 10, causing the soil to exert an upward force on the tail end of the appurtenance 210, the appurtenance 210 will move upwardly within the through-opening 122 and with respect to the stationary wedge member 250 and causing the constant force coil spring 270 to partially unwind. When the planter row unit 10 begins to move in the forward direction of travel 34, the bias of the constant force coil spring 270 will pull downwardly on the appurtenance 210 forcing it to return to its normal operating position.

Another embodiment of a reversible seed trench appurtenance assembly is shown in FIGS. 9-13, designated generally by reference number 300. The assembly 300 includes a seed trench appurtenance 310 having an upper portion 312 and a trailing portion 313. The upper portion 312 is received within the mounting bracket 100 as described below. As in the previous embodiment, the trailing portion 313 of the seed trench appurtenance 310 may be any desired configuration of a seed firmer, seed rebounder or seed deflector that extends into the seed trench. Thus, since the tailing portion may vary, only the upper portion 312 of the seed trench appurtenance 310 is shown in FIGS. 9-13.

Figure 10:
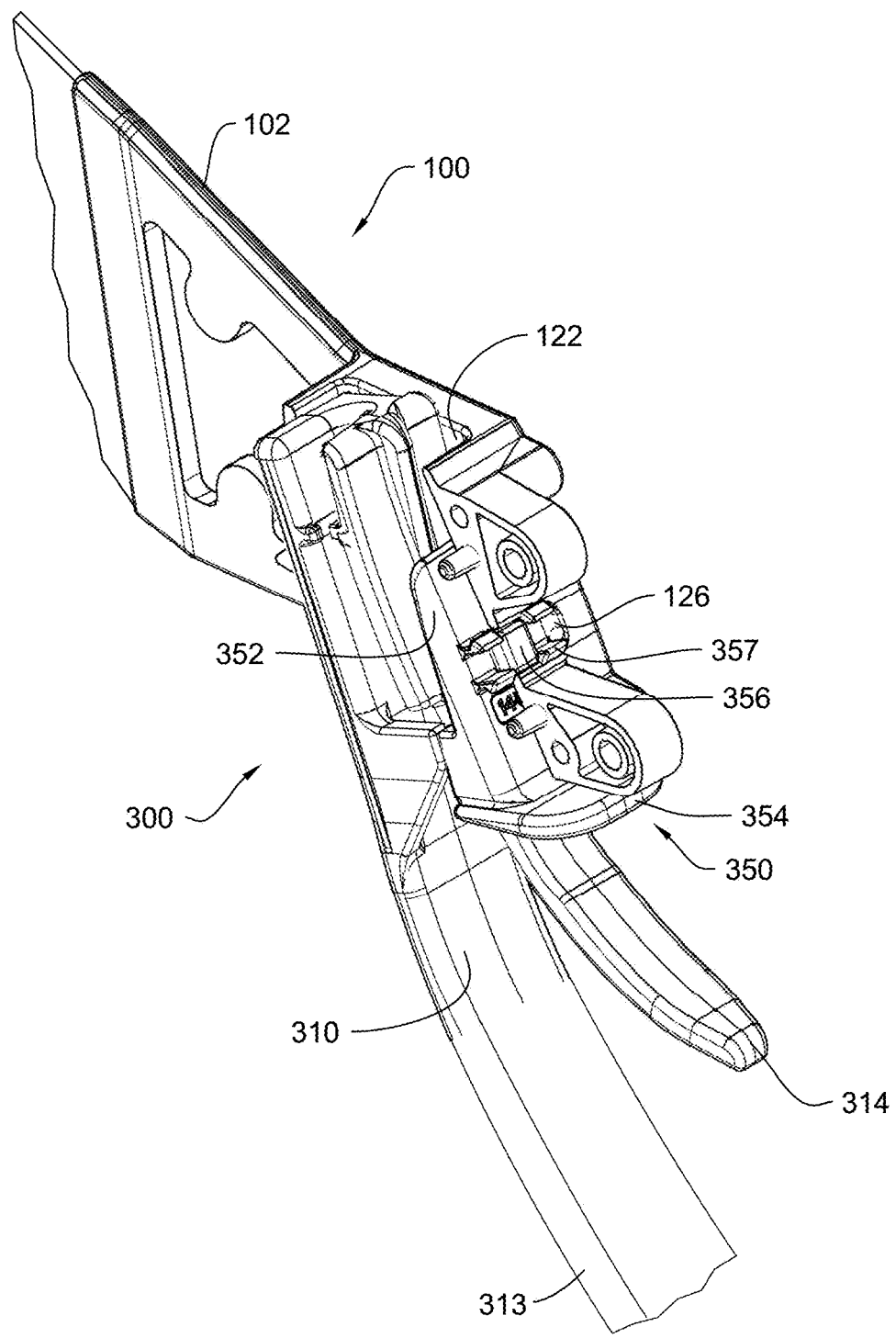
FIG. 10 is a rear perspective view of the assembled reversible seed trench appurtenance of FIG. 9, but with one side of the mounting bracket removed for clarity.
Figure 13:
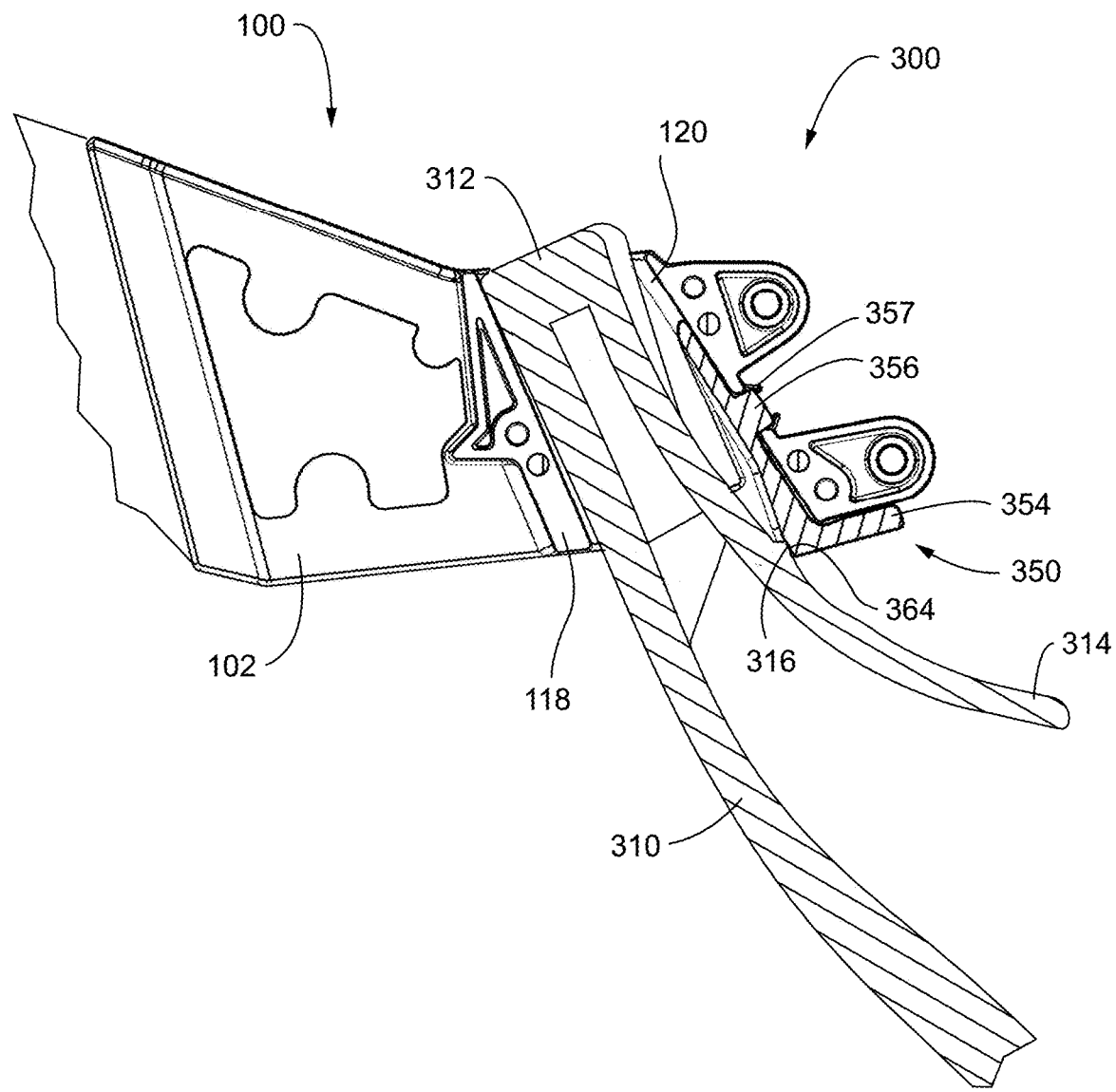
FIG. 13 is a side elevation view of the assembled reversible seed trench appurtenance of FIG. 10 in the normal operating position.
Figure 13A:
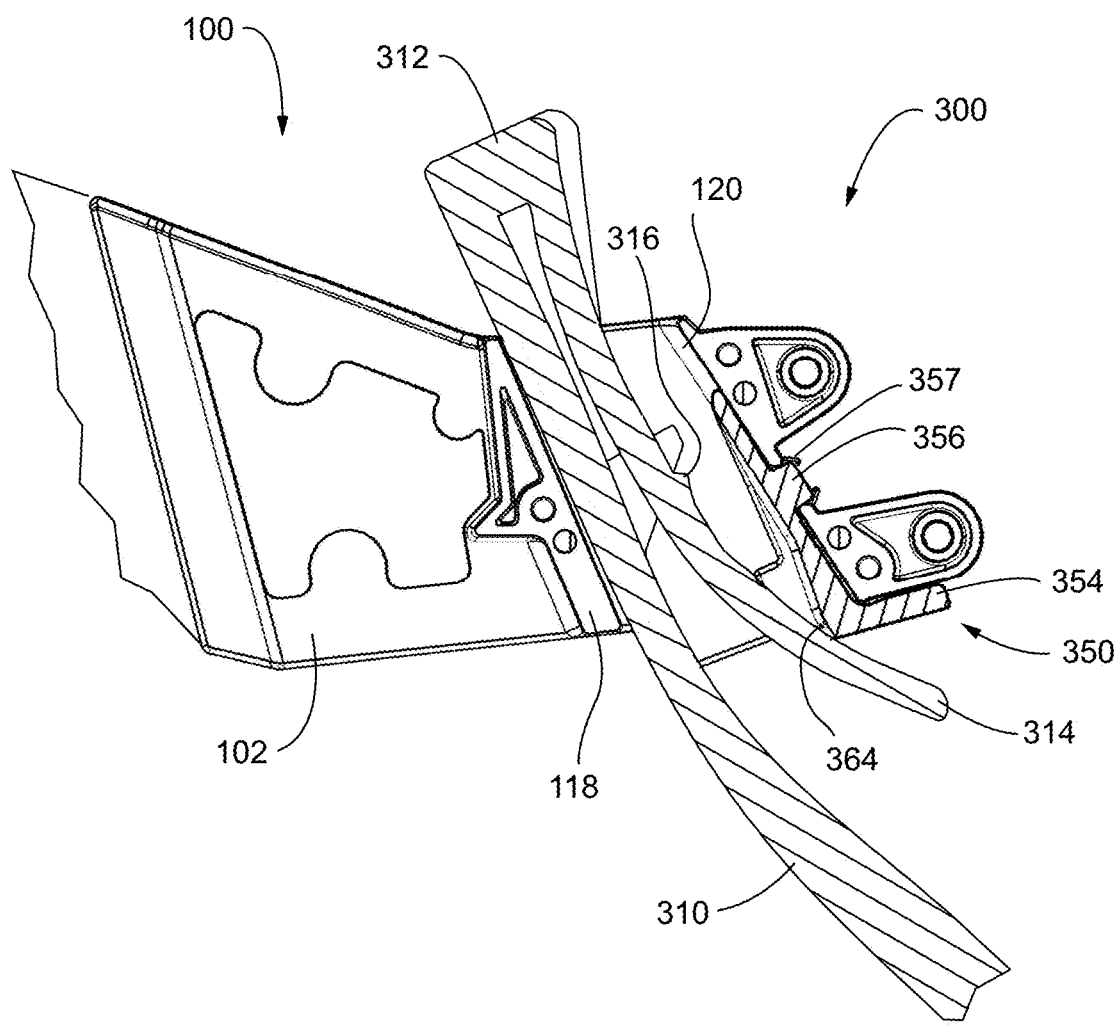
FIG. 13A is the same side elevation view as FIG. 13 but showing how the seed trench appurtenance is able to move upward with respect to the mounting bracket to avoid damage in the event the planter is reversed without lifting the row unit.

The upper portion 312 of the seed trench appurtenance 310 is similar to the upper portion 72 of prior art seed firmer 70 described above in that the upper portion 312 includes a downturned, resilient arm 314 having a rearwardly projecting arm tab 316 that extends into the transverse slot 126 of the bracket 100. However, unlike the prior art seed firmer 70, the forward side of the resilient neck of the appurtenance 310 does not have a forwardly projecting lip, because such a lip would prevent the appurtenance 310 from moving upwardly within the through-opening 122 as described below. The upper portion 312 with the downturned resilient arm 314 is configured to be received within the through-opening 122 of the bracket 100 along with a portion of a wedge member 350. The upper portion of the resilient arm 314 may also include shoulders 318, 319 (FIG. 9) for purposes discussed later. The wedge member 350 cooperates with upper resilient arm 314 of the appurtenance 310 to secure the upper portion 312 within the bracket 100 during normal operation as shown in FIGS. 10 and 13 (i.e., when the planter is moving in the forward direction of travel 34 (FIG. 1)), but permits the appurtenance 310 to move upwardly relative to the bracket 100 as shown in FIG. 13A in the event the planter is reversed without first raising the row unit 10 above the soil.

Figure 11:
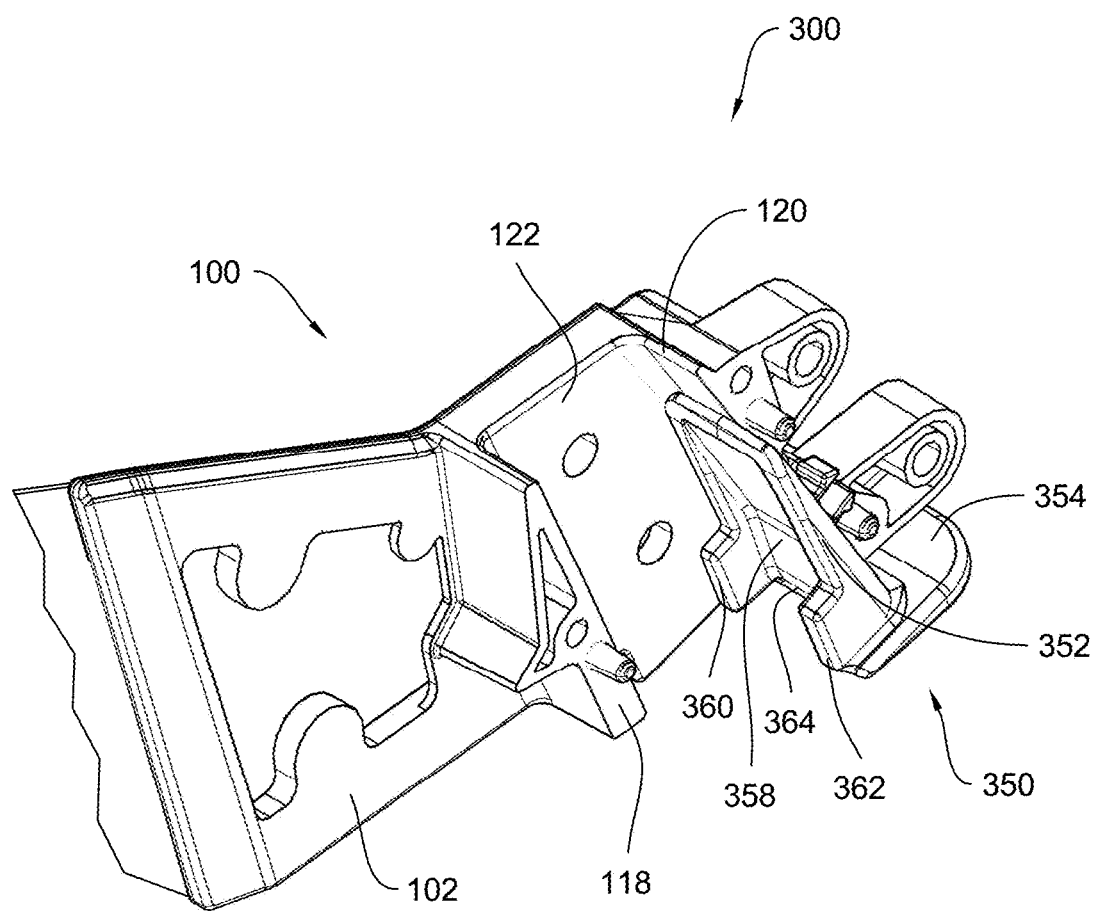
FIG. 11 is a partially assembled front perspective view of FIG. 9 with the wedge member positioned within the mounting bracket, but with the seed trench appurtenance removed or not yet inserted into the mounting bracket.
Figure 12A:
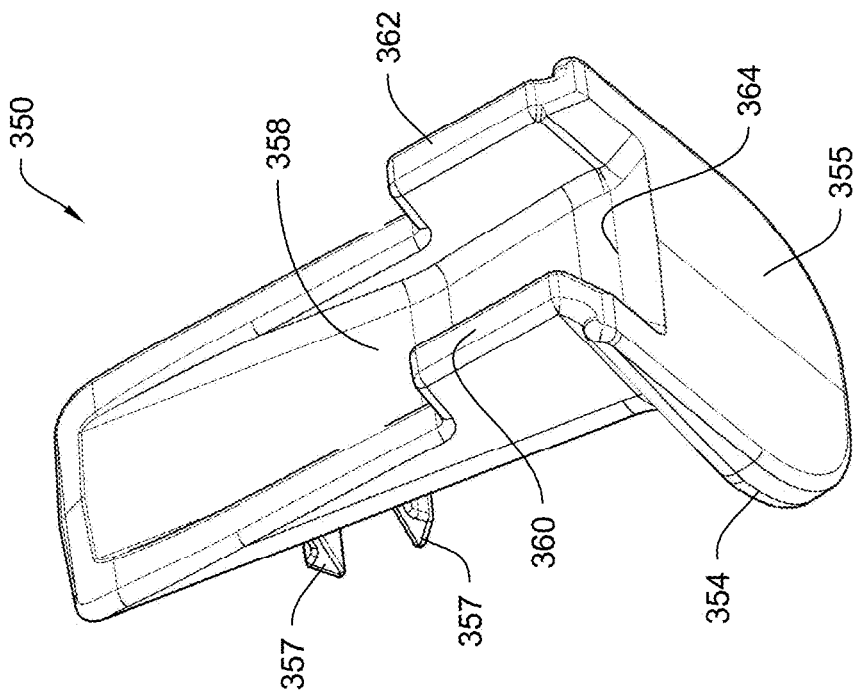
FIG. 12A is a bottom perspective of the wedge member of FIG. 12.
Figure 12:
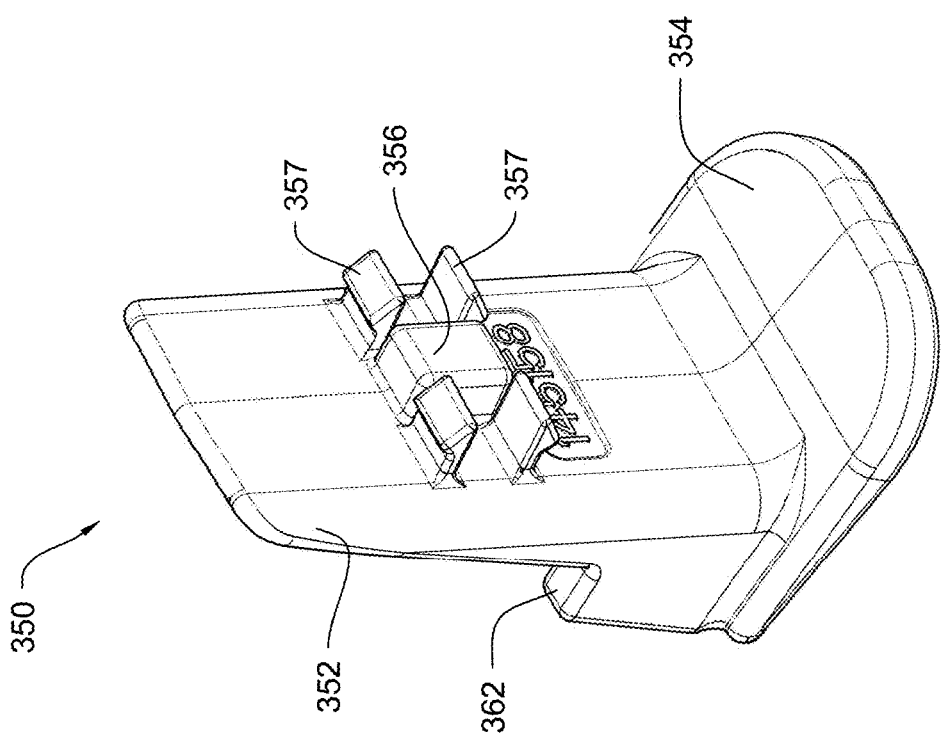
FIG. 12 is a rear perspective view showing the wedge member of FIG. 9

As best viewed in FIGS. 12 and 12A, the wedge member 350 includes an upper wedge shaped portion 352 and a bottom flange 354 having a bottom surface 355. The rearward face of the upper wedge shaped portion includes a rearwardly projecting tab 356 and clips 357. The forward side of the wedge member 350 includes a concave recessed area 358 between forwardly projecting flanges 360, 362. A slight indentation 364 is provided in the concave recessed area 358 to receive the arm tab 316. As shown in FIG. 11, when assembling the reversible seed trench appurtenance assembly 300, the wedge member 350 is first inserted into the through-opening 122 of the bracket 100 with the rearward projecting tab 356 and clips 357 received with the transverse slot 126 of the bracket 100 (see FIGS. 10, 13, and 13A). The upper end of the bottom flange 354 abuts the bottom of the bracket 100 (see FIGS. 10, 11, 13, and 13A).

In an alternative embodiment, arm tab 316 on the resilient arm 314 may be eliminated. In this alternative embodiment, the flanges 360, 362 of the wedge member 350 abut the respective shoulders 318, 319 (FIG. 9) of the resilient arm 314. The engagement of flanges 360, 362 with notches 318, 319 prevents the appurtenance 310 from sliding down or being withdrawn from through-opening 122. To remove the appurtenance 310 from the bracket 100, the resilient arm 314 is depressed (i.e., toward the forward direction) to disengage the shoulders 318, 319 from the flanges 360, 362, permitting the seed trench appurtenance 310 to slide downward with respect to the wedge member 350.

With the wedge member 350 received in the through-opening 122 of the bracket 100, the upper portion 312 of the appurtenance 310 is then inserted into the through-opening 122 forward of the wedge member 350 from the underside of the bracket 100 until the arm tab 316 is received within the indentation 364 in the concave recessed area 358. The resiliency of the downturned arm 314 retains the arm tab 316 within the indentation 364 preventing the appurtenance 310 from sliding down within the through-opening 122, but as shown in FIG. 13A, the appurtenance 310 is able to move upwardly within the through-opening 122 with respect to the stationary wedge member 350 when a force acting on the tail end of the appurtenance is sufficient to overcome the bias of the downturned arm 314 and force the arm tab 316 of the indentation 364.

Thus, if the planter is reversed without first raising the row unit 10, causing the soil to exert an upward force on the tail end of the appurtenance 310, the appurtenance 310 will move upwardly within the through-opening 122 and with respect to the stationary wedge member 350. However, unlike the previous embodiment 200 having the coiled flexible tape to automatically pull the appurtenance back down to the normal operating position, the embodiment 300 is not biased downwardly. Instead, once the appurtenance 310 is forced upwardly (FIG. 13A), the operator must manually pull down on the appurtenance 310 to return it to its normal operating position (FIG. 13).

Figure 14:
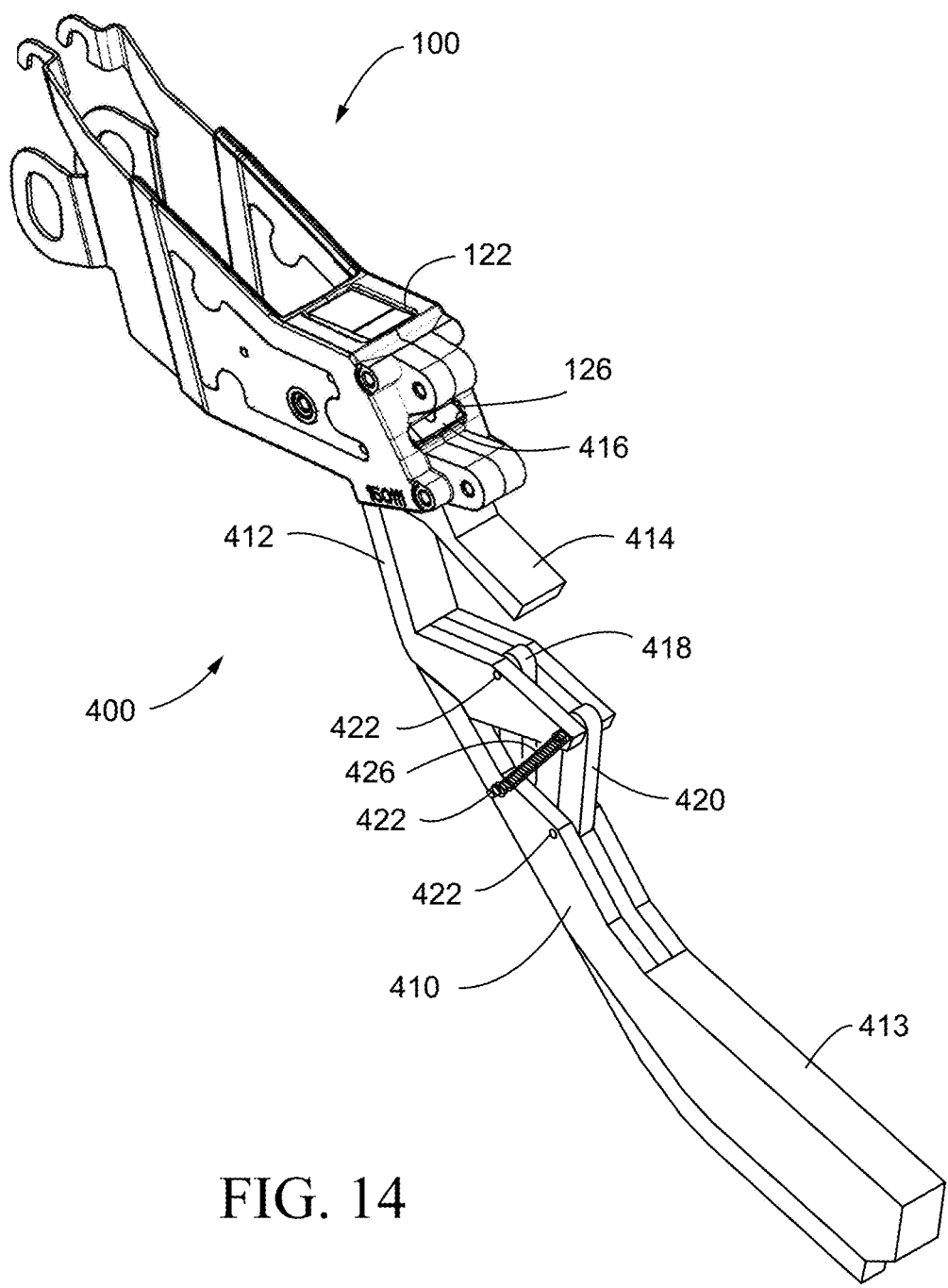
FIG. 14 is a rear perspective view of another embodiment of a reversible seed trench appurtenance.
Figure 15:
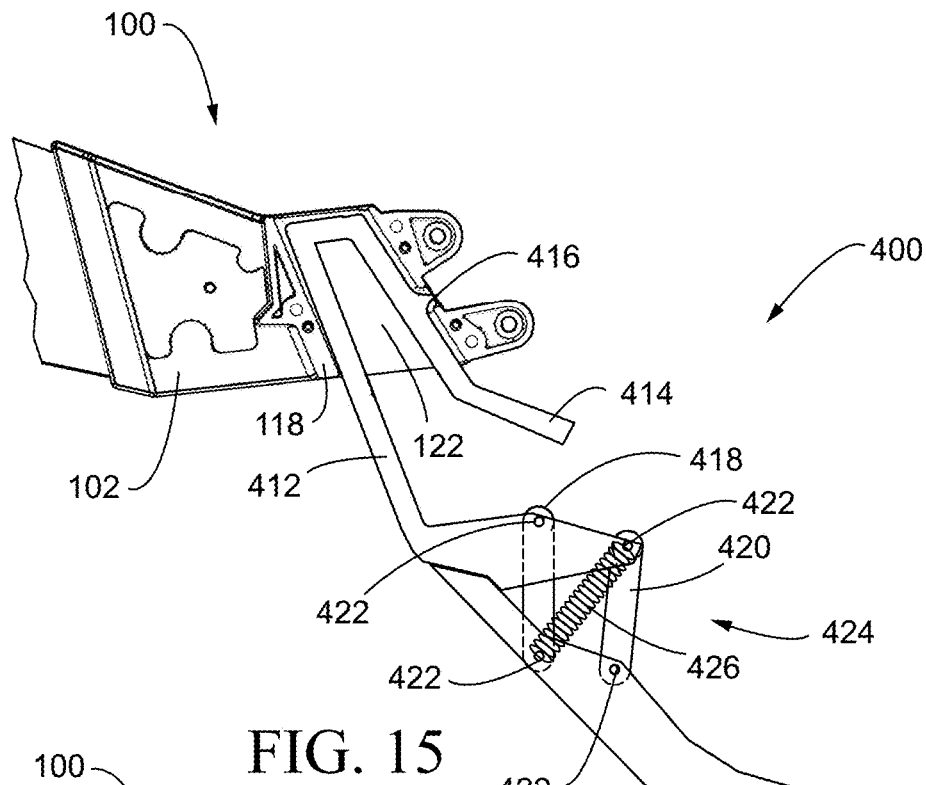
FIG. 15 is a side elevation view of the reversible seed trench appurtenance of FIG. 14 in the normal operating position.

Another embodiment of a reversible seed trench appurtenance assembly is shown in FIGS. 14-15, designated generally by reference number 400. The assembly 400 includes a seed trench appurtenance 410 having an upper portion 412 and a trailing portion 413. The upper portion 412 is received within the mounting bracket 100 as described below. In this embodiment, the seed trench appurtenance 410 is in two parts and unlike the previous embodiments 200, 300 described above, in this embodiment, the upper portion 412 of the appurtenance 410 does not move within the through-opening 122 of the bracket 100 (excluding when removing the upper portion 412 from the bracket 100 or when inserting the upper portion 412 into the bracket 100). Instead, the trailing portion 413 is movable with respect to the upper portion 412 via a four-bar linkage 424.

Figure 15A:
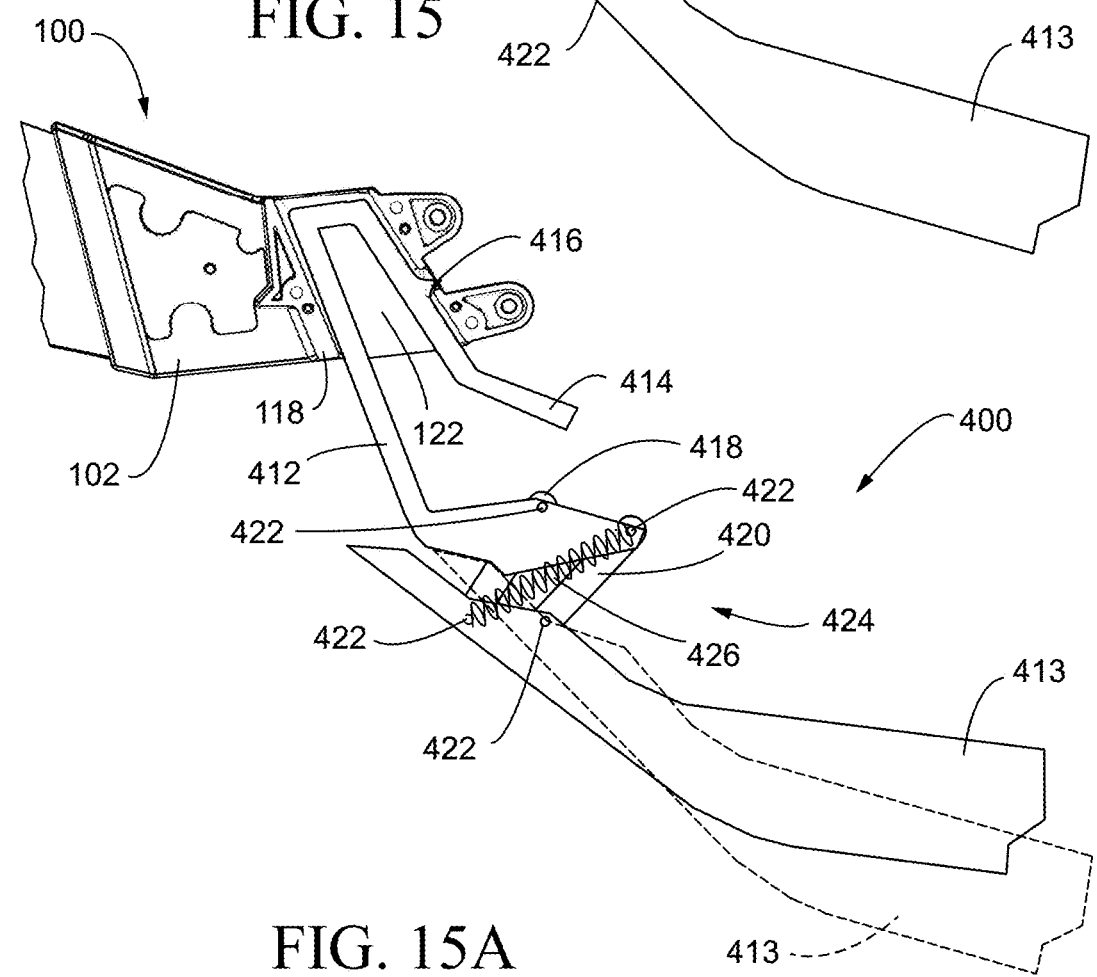
FIG. 15A is the same side elevation view as FIG. 15 but showing how the seed trench appurtenance is able to move upward with respect to the mounting bracket to avoid damage in the event the planter is reversed without lifting the row unit.
Figure 16:
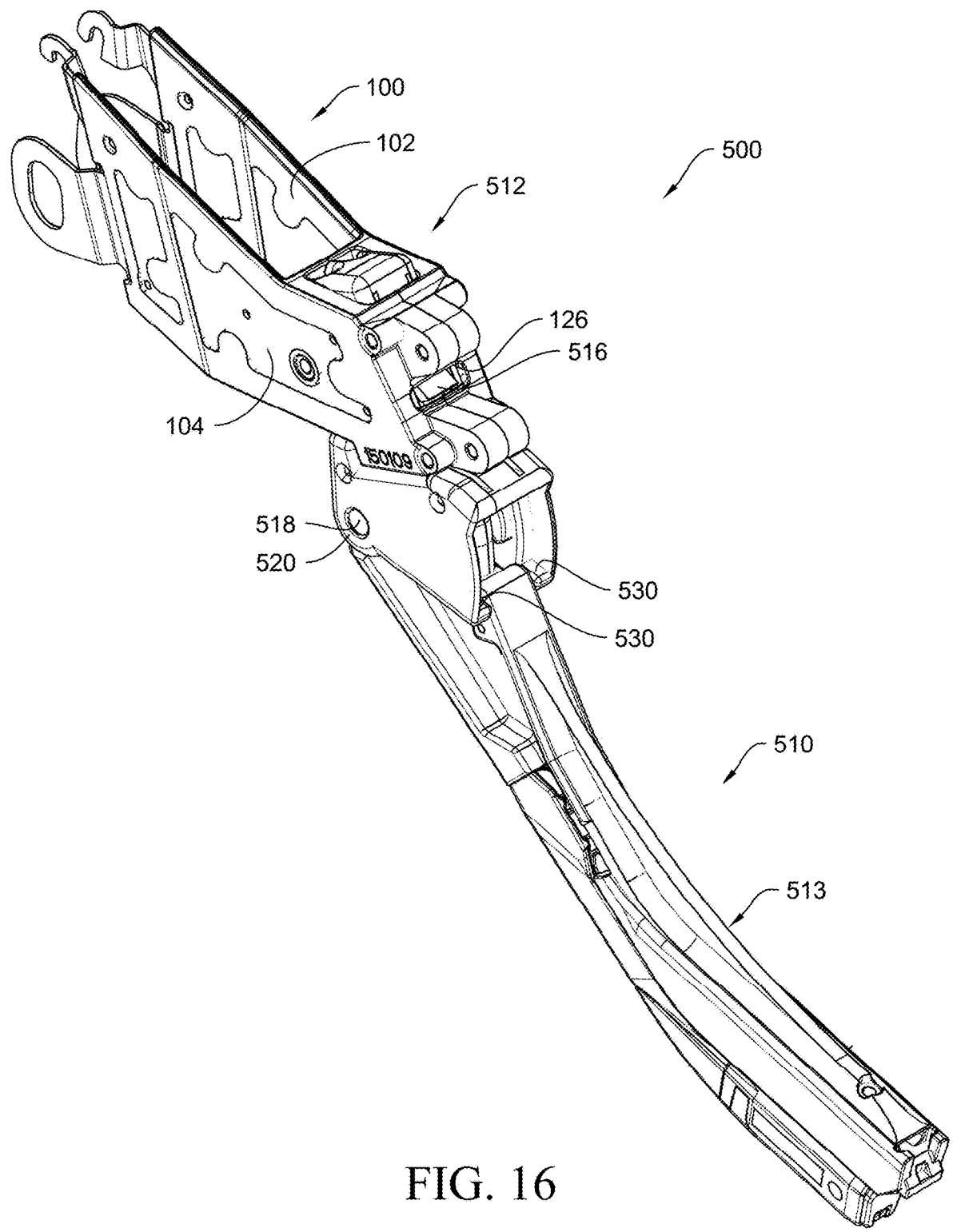
FIG. 16 is a rear perspective view of another embodiment of a reversible seed trench appurtenance.

The four-bar linkage 424 includes a forward linkage 418, and rearward linkage 420, each of which is pivotally connected by pins 422 to the upper portion 412 and to the trailing portion 413. of the appurtenance. A biasing element 426, such as a spring, extends between the upper portion 412 and the trailing portion 413. The biasing element 426 biases the trailing portion 413 downwardly toward the soil in the normal operating position as shown in FIG. 15. In the event the planter is reversed without first raising the row unit 10 above the soil, the force exerted by the soil as the row unit is reversed will cause the trailing portion 413 to translate forwardly and upwardly as shown in FIG. 15A from its normal operating position (shown in dashed lines in FIG. 15A), forcing the biasing element 426 to stretch as shown. When the planter again moves forward, the bias of the biasing element 426 will return the trailing portion 413 to its normal operating position.

It should be appreciated that in the embodiment 400, the upper portion 412 and trailing portion 413 may be made of flexible or resilient plastic material (e.g., UHMW) the same as the other embodiments 200, 300 and other commercially available seed firmers. Alternatively, because the four bar linkage allows the trailing portion 413 to easily translate forwardly and upwardly with respect to the stationary or fixed upper portion 412, both of the upper portion 412 and trailing portion 413 may be constructed of rigid material (i.e., non-flexible material), such as steel.

Another embodiment of a reversible seed trench appurtenance assembly is shown in FIGS. 16-21, designated generally by reference number 500. In this embodiment, the reversible seed trench appurtenance assembly 500 utilizes the same mounting bracket 100 as described above. The seed trench appurtenance 510 includes an upper portion 512 and a trailing portion 513. The upper portion 512 includes a resilient arm 514 (FIG. 17, 20) with a rearward projecting arm tab 516. The upper portion 512 is sized to be received into the through-opening 122 from the underside of the bracket 100. As the upper portion 512 is pushed into the through-opening 122, the resilient arm 514 is forced inwardly (forwardly) until the rearward projecting arm tab 516 snaps outwardly (rearwardly) upon alignment with the transverse slot 126 of the bracket 100. It should be appreciated that the upper portion 512 is thus securely fixed within the bracket 100, while also being removable from the bracket 100 by depressing the resilient arm 514 to release the arm tab 516 from the transverse slot 126 of the bracket 100 allowing the upper portion 512 to be pulled downwardly and removed from the through-opening 122. The upper portion 512 may include one or more channels 517-1, 517-2 (FIG. 19) for receiving liquid delivery tubes 519-1, 519-2 (FIG.

19) for delivering liquid product into the seed trench. The liquid delivery tubes 519 may extend through the body of the trailing portion 513 or the liquid delivery tubes 519-1, 519-2 may couple with fittings 521-1, 521-2 disposed on each side of the trailing portion 513. Each fitting 521-1, 521-2 may be in fluid communication with a separate passageway 523, each with an outlet end 525 at the rearward end of the trailing member 513, or the passageways 523 may merge into a single passageway with a single outlet 525 at the rearward end of the trailing member 513.

The trailing portion 513 of the appurtenance 510 is pivotally secured to the upper portion 512 by a pin 518 received within a hub 520 of the upper portion 512, thus allowing the trailing portion 513 to pivot upwardly and downwardly (as indicated by arrow 515) with respect to the upper portion 512 about the pin 518. The trailing portion 513 may be any desired configuration of a seed firmer, seed rebounder or seed deflector that extends into the seed trench. The trailing portion 513 is rigid such that is capable of plowing into the soil without bending if the planter is reversed without the row units being raised. For example, the lower trailing 513 may be made of steel or other suitably rigid material.

Figure 20:
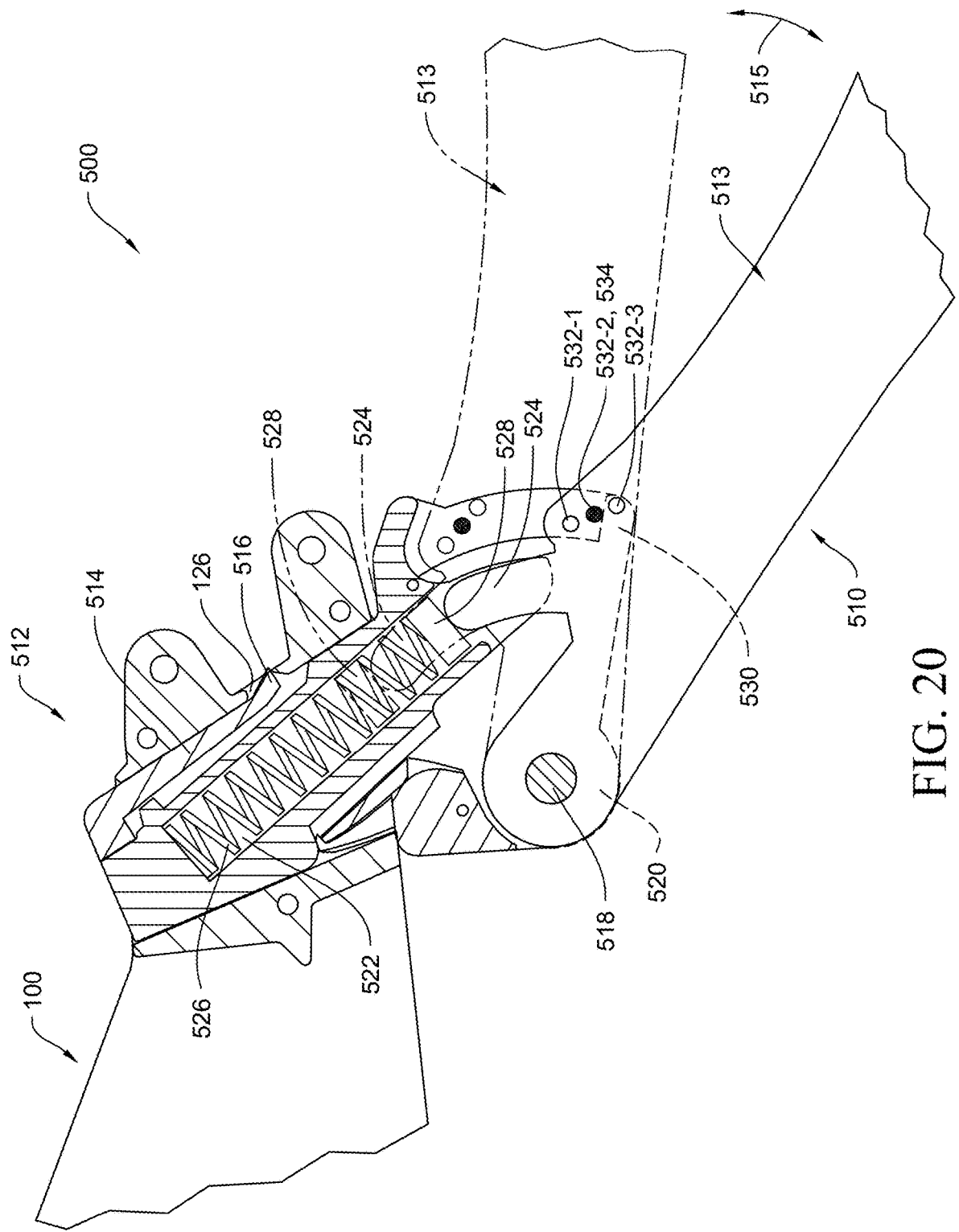
FIG. 20 is an enlarged partial cross-sectional view of the reversible seed trench appurtenance of FIG. 16 showing the pivotal movement of the trailing end of the seed trench appurtenance with respect to the upper portion retained within the mounting bracket.

The upper portion 512 includes a bore 522 which receives an arcuate ram 524 on the upper end of the trailing portion 513. As the trailing portion 513 pivots about the pin 518, the arcuate ram 524 moves upwardly into the bore 522 (FIG. 20). A biasing element 526, such as a spring, is received within the bore 522 and includes a cap 528 that is biased against the arcuate ram 524. Thus, it should be appreciated that the trailing end 513 is biased downwardly by the spring 526. Examples of biasing elements 526 include, but are not limited to, coil springs, leaf springs, and torsion springs. In some embodiments, the downward bias of the biasing element 526 may be sufficiently strong to keep the trailing portion 513 in the normal operating position without pivoting upwardly when the planter is reversed with the row units in the lowered planting position, such that the trailing portion 513 will plow into the soil as the planter is reversed. However, if the trailing portion 513 encounters an immovable object in the soil, such as a large rock, while being reversed, the trailing portion 513 is capable of pivoting upwardly about the pin 518 when the impact force exceeds the downward bias of the spring 526. In other embodiments, the bias of the spring 526 may be sufficient to ensure the trailing portion 513 applies a sufficient downforce to embed the seeds while traveling in the forward direction, but upon reversal the bias is not so great that the trailing portion 513 is able to pivot upwardly to avoid plowing into the soil.

Figure 17:
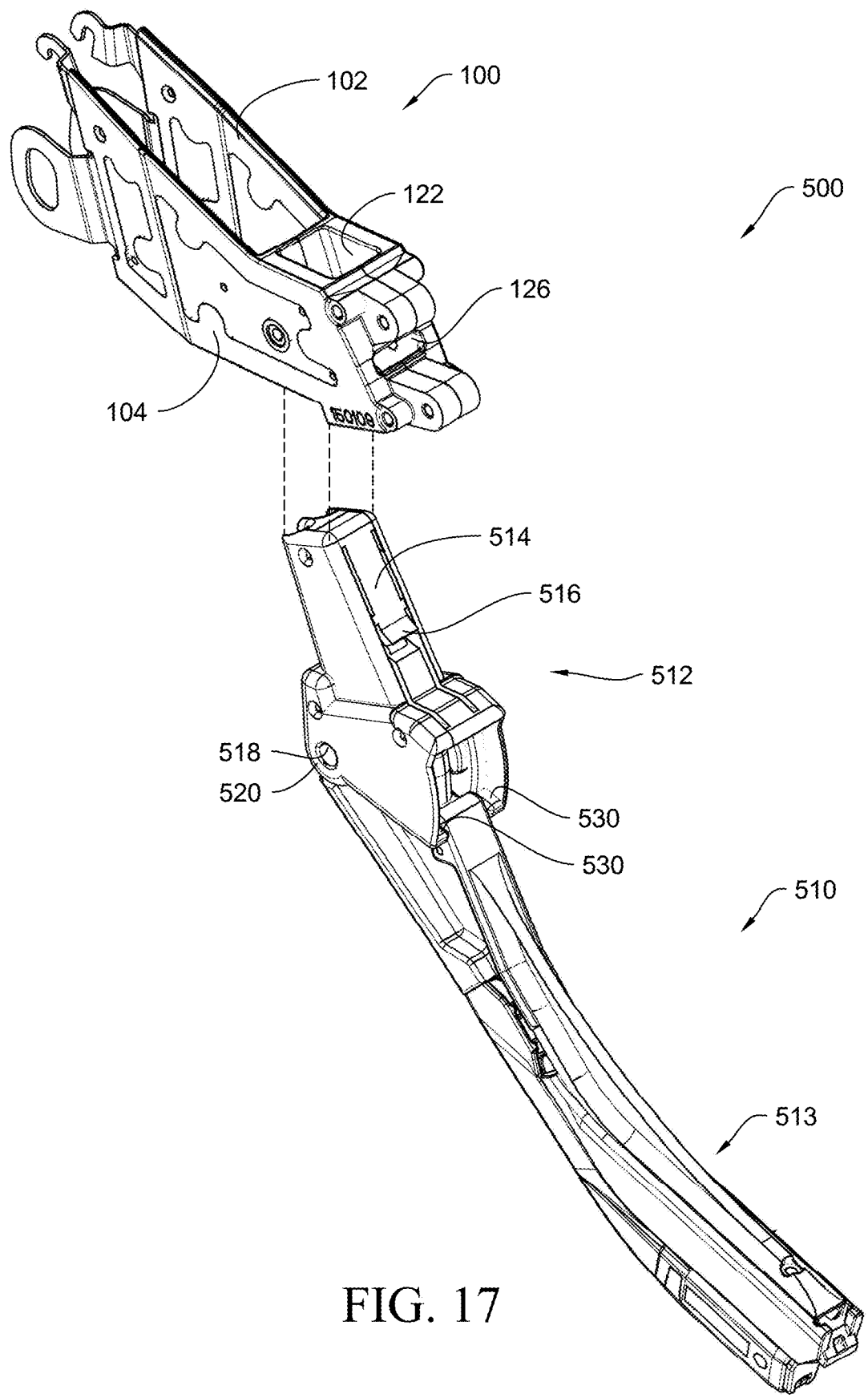
FIG. 17 is an exploded rear perspective view of the reversible seed trench appurtenance of FIG. 16.
Figure 18:
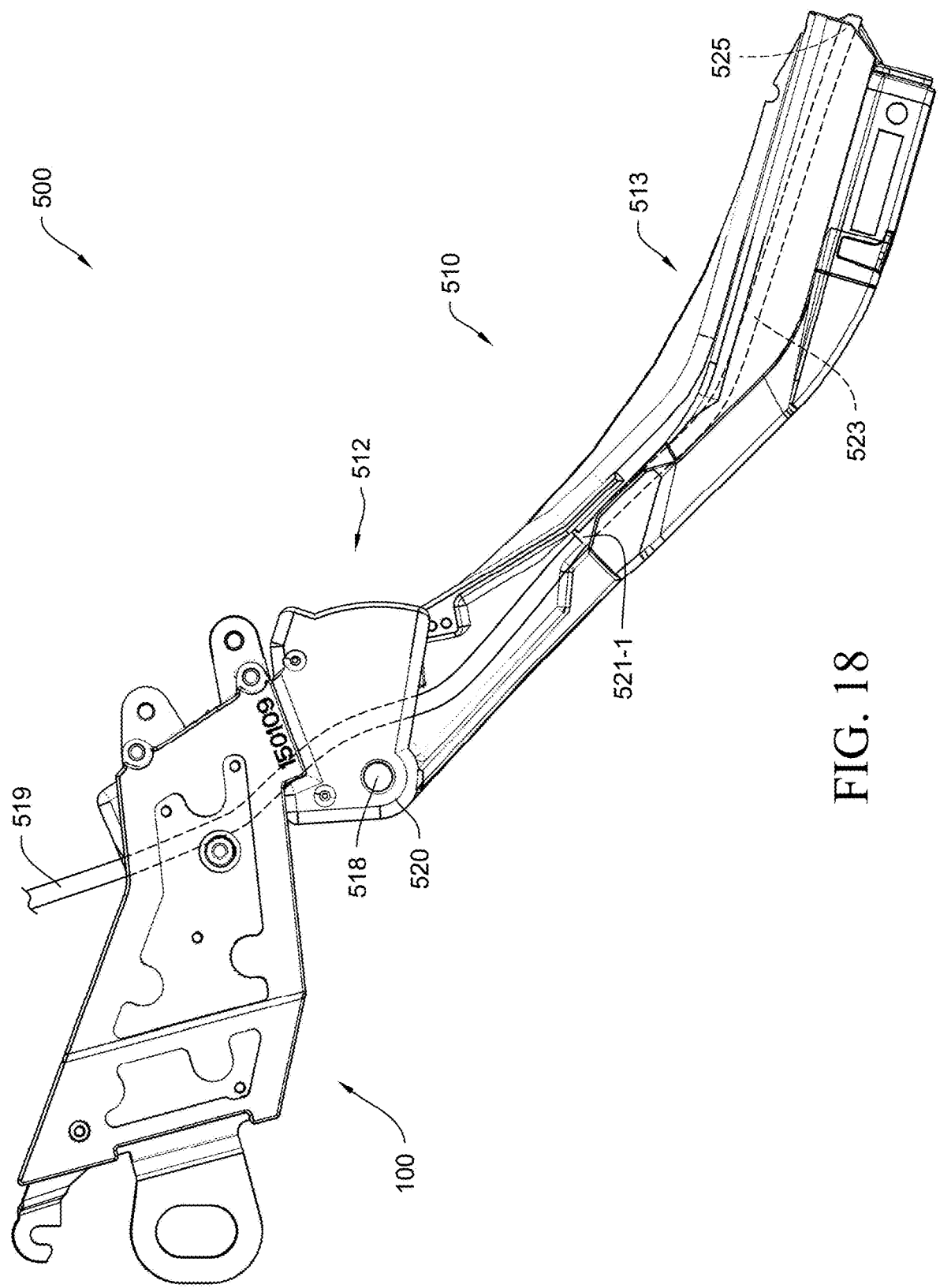
FIG. 18 is a side elevation view of the reversible seed trench appurtenance of FIG. 16 showing a liquid delivery tube.
Figure 19:
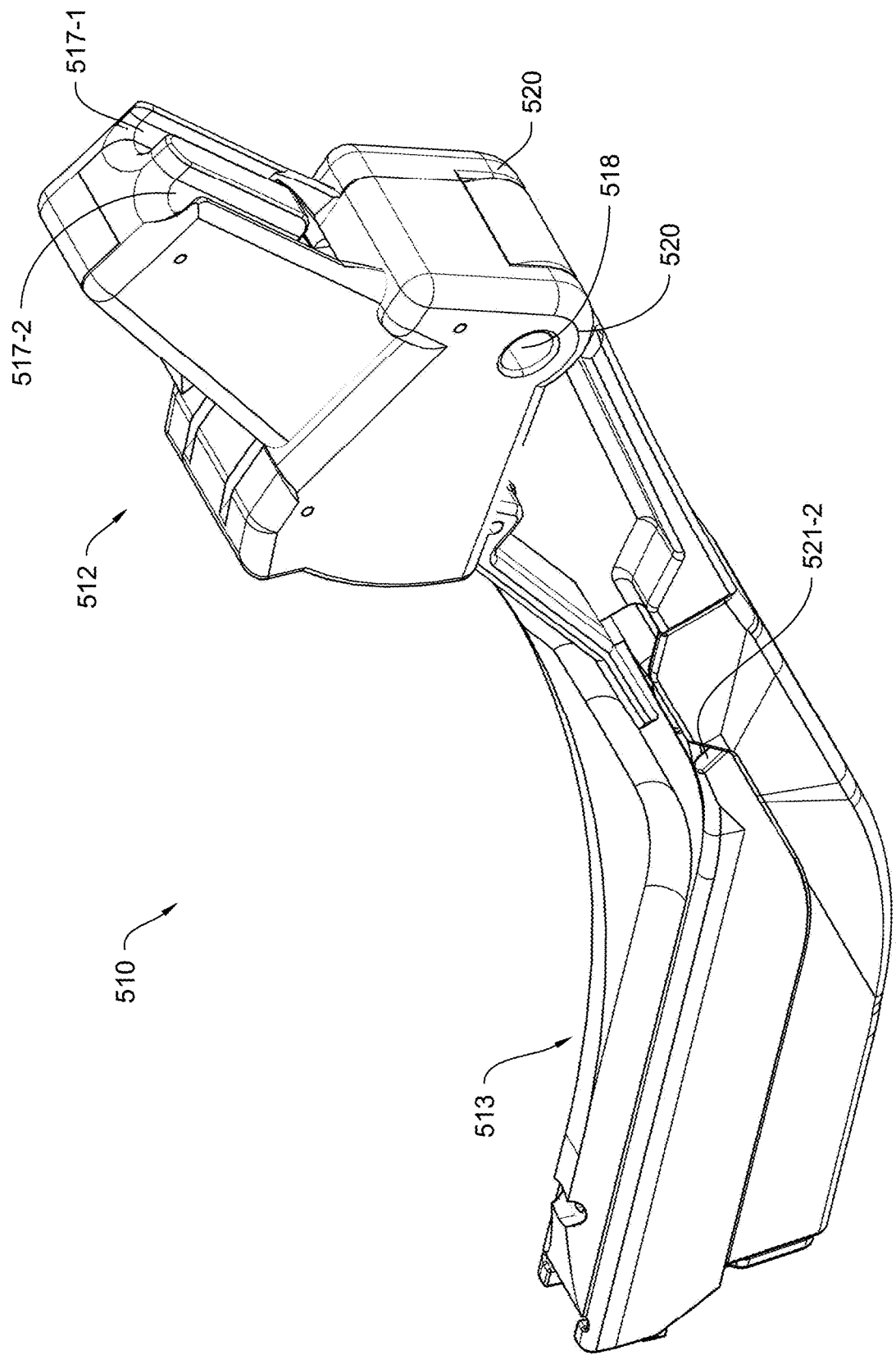
FIG. 19 is a front perspective view of the reversible seed trench appurtenance of FIG. 16.
Figure 21:
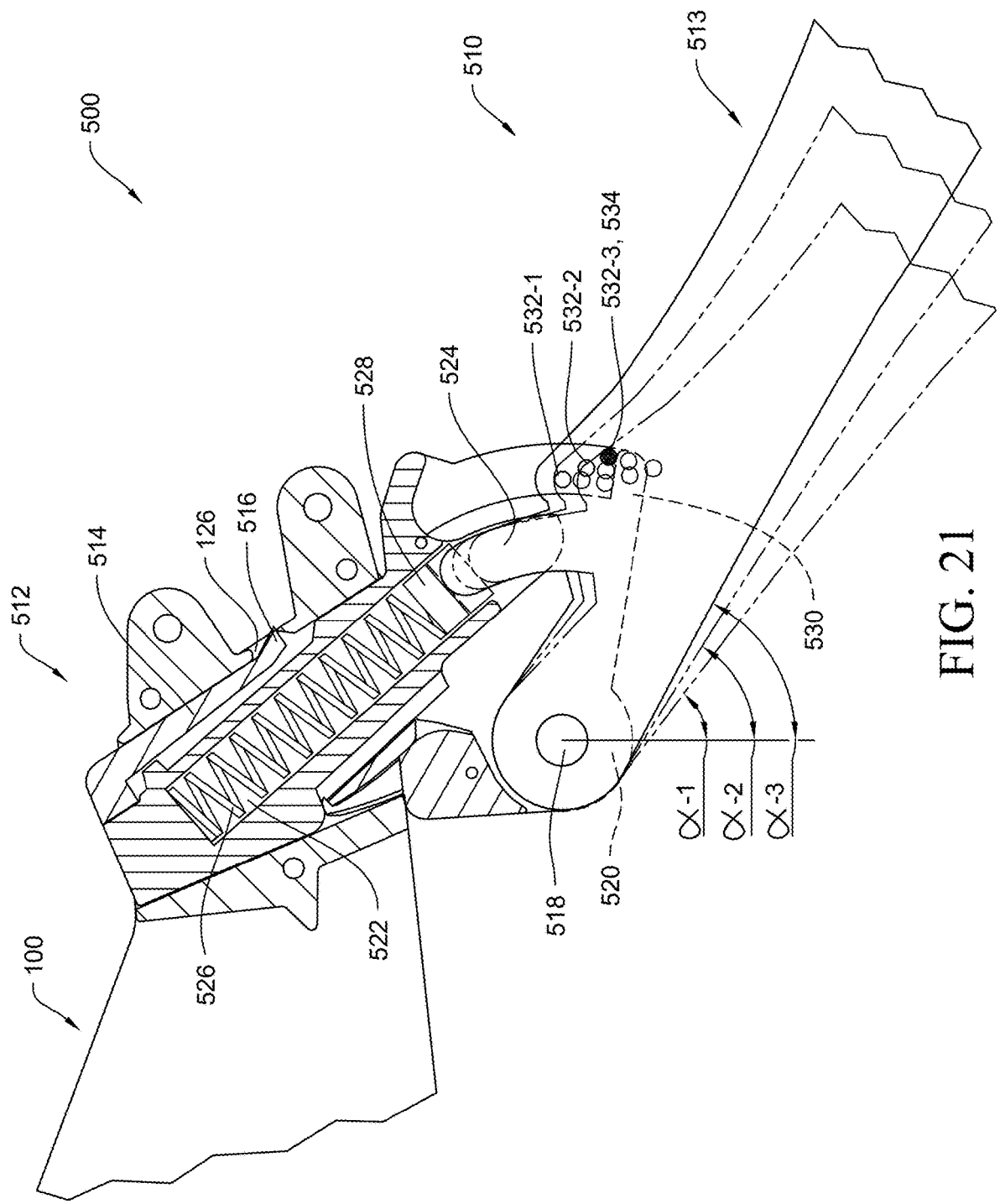
FIG. 21 is the same side elevation view as FIG. 20 showing the trailing end set at different positions relative to the upper portion.

As best viewed in FIGS. 17, 20 and 21, the upper portion 512 includes rearwardly projecting flanges 530 disposed on each side of the pivoting trailing portion 513. The upper end of the trailing portion 513 includes a plurality of apertures 532-1, 532-2, 532-3 adapted to receive a pin 534 for setting the trailing portion 513 at different respective angles α-1, α-2, α-3 with respect to vertical. It should be appreciated, that the pin 534 is sufficiently long so that one end of the pin 534 projects outwardly from each side of the aperture to serve as a downward stop for the trailing portion 513 by abutting the upper surface of the rearwardly projecting flanges 530. For example, referring to FIG. 21, by placing the pin 34 into each of the respective apertures 532-1, 532-2, 532-3, the angular position of the trailing portion 513 with respect to vertical changes between angle α-1, angle α-2 and angle α-3 respectively. When pin 534 contacts flanges 530, additional rigidity is provided to trailing portion 513 when the planter is reversed.

Figure 22:
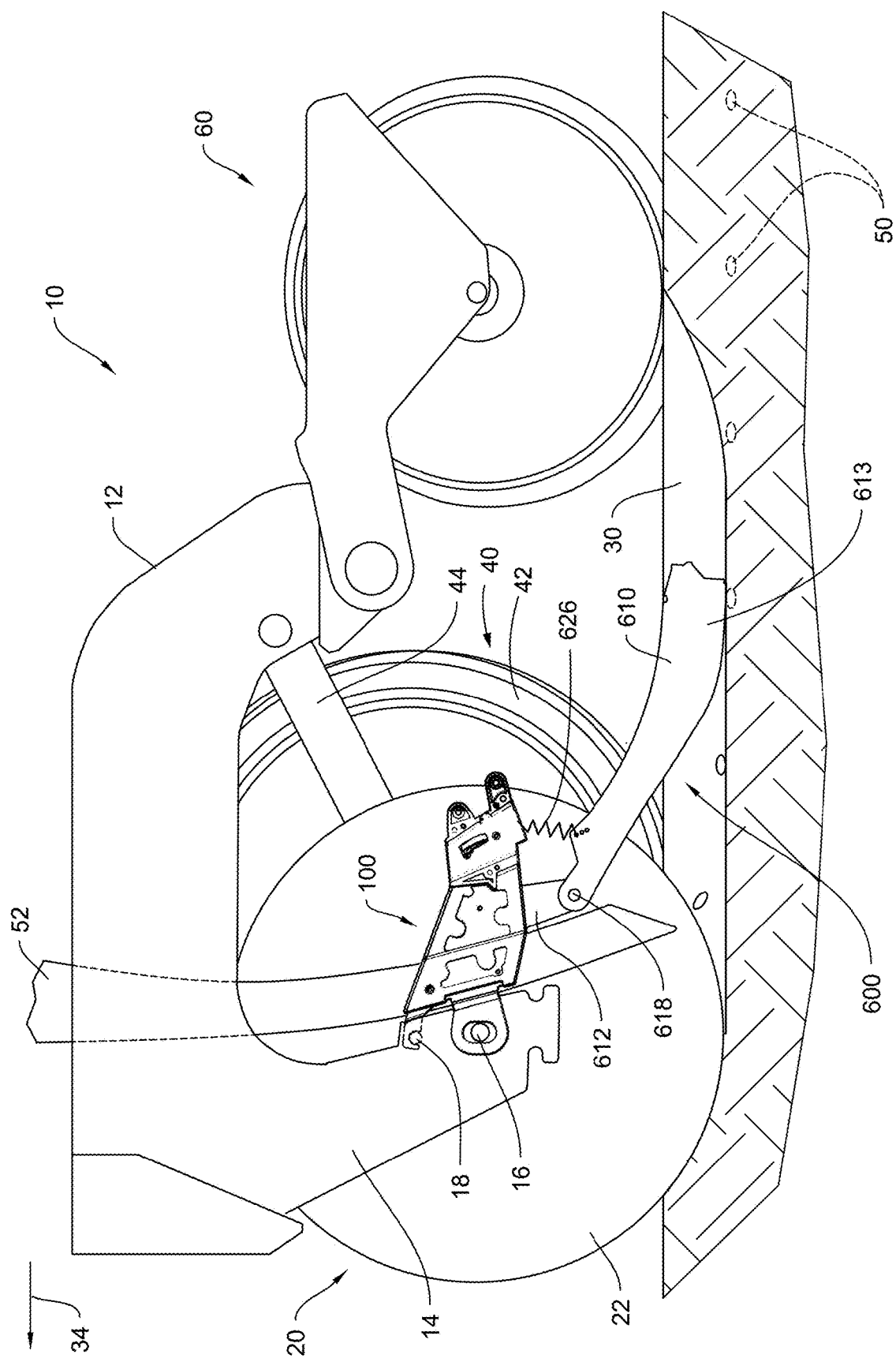
FIG. 22 is a side elevation view of another embodiment of a reversible seed trench appurtenance.
Figure 23:
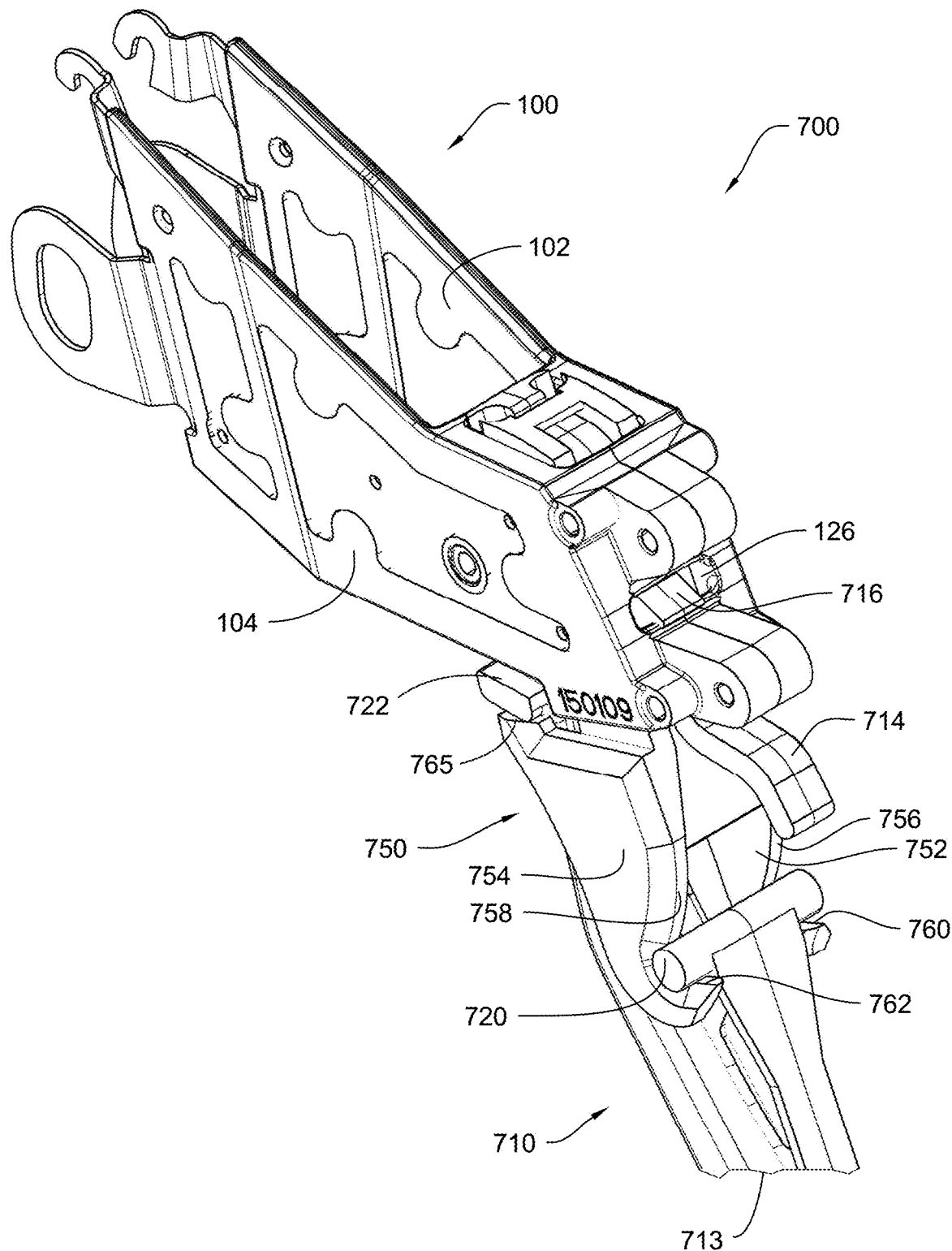
FIG. 23 is a rear perspective view of another embodiment of a reversible seed trench appurtenance.
Figure 24:
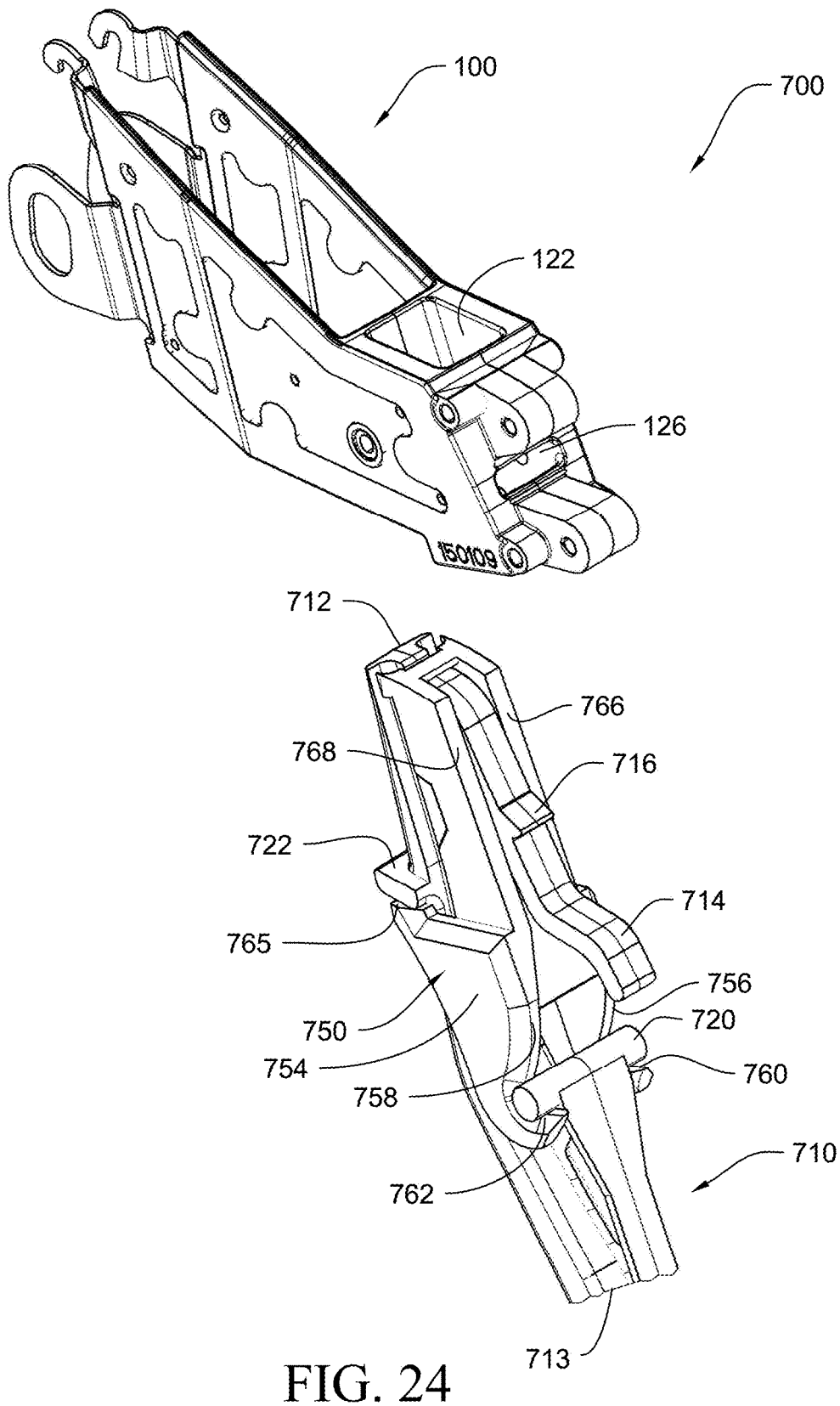
FIG. 24 is an exploded rear perspective view of the reversible seed trench appurtenance of FIG. 23.

Another embodiment of a reversible seed trench appurtenance assembly is shown in FIG. 22, designated generally by reference number 600. In this embodiment, the seed trench appurtenance 610 includes a rigid trailing portion 613 similar in design to the rigid trailing portion 513 of the seed trench appurtenance 510 described in embodiment 500 above. However, in this embodiment, the trailing portion 613 is pivotably connected by a pivot pin 618 to an ear 612 extending from the mounting bracket 100. A biasing element 626 is disposed between mounting bracket 100 and the trailing portion 613 of the seed trench appurtenance 610 to bias the trailing portion 613 towards the seed trench. In some embodiments, the downward bias of the biasing element 626 may be sufficiently strong to keep the trailing portion 613 in the normal operating position without pivoting upwardly when the planter is reversed with the row units in the lowered planting position, such that the trailing portion 613 will plow into the soil as the planter is reversed. However, if the trailing portion 613 encounters an immovable object in the soil, such as a large rock, while being reversed, the trailing portion 613 is capable of pivoting upwardly about the pin 618 when the impact force exceeds the downward bias of the spring 626. In other embodiments, the bias of the spring 626 may be sufficient to ensure the trailing portion 613 applies a sufficient downforce to embed the seeds while traveling in the forward direction, but upon reversal the bias is not so great that the trailing portion 613 is able to pivot upwardly to avoid plowing into the soil.

A rigid reversible seed trench appurtenance assembly 500 or 600 has several benefits. Rigid materials such as steel or other rigid materials can be used in place of the resilient materials such as plastics or other materials that flex or bend. Such resilient or flexible materials tend to relax (creep) over time and lose their firming force. Alternate biasing elements (springs) can be interchanged to change the firming force depending on soil and seeding conditions, such as for clay that requires a higher firming force or for sandy soils that require a lighter firming force.

Another embodiment of a reversible seed trench appurtenance assembly is shown in FIGS. 23-28, designated generally by reference number 700. In this embodiment, the mounting bracket 100 is the same as described above. The seed trench appurtenance 710 includes an upper portion 712 and a trailing portion 713. The upper portion 712 is similar to the upper portion 72 of prior art seed firmer 70 described above, wherein the upper portion 712 includes a downturned resilient arm 714 having a rearwardly projecting arm tab 716 that extends into the transverse slot 126 of the bracket 100. The seed trench appurtenance 710 includes a transverse post 720, a forwardly projecting shelf 722, and an upper notch 724 in the upper portion 712 of the downturned leg 714 (the purpose of the post 720, the forward projecting shelf 722 and the upper notch 724 are discussed later). Like the previous embodiments 200, 300 discussed above, the seed trench appurtenance 710 may be any desired configuration of a seed firmer, seed rebounder or seed deflector that extends into the seed trench. Thus, since the configuration of the trailing portion of the seed trench appurtenance 710 may vary, only the upper portion 712 of the seed trench appurtenance 710 is shown in FIGS. 23-28.

As best viewed in FIGS. 25 and 26, a coupling member 750 includes laterally spaced, downwardly extending ears 752, 754, each having respective arcuate lobes 756, 758 and rearward hooks 760, 762. The forward ends of the ears 752, 754 include respective forwardly projecting legs 764, 765 (discussed later). The upper portion of the coupling member 750 includes rearwardly extending sidewalls 766, 768 spaced laterally to receive the downturned resilient arm 714 of the appurtenance 710 therebetween (see FIG. 27B discussed later). Extending laterally between the sidewalls 766, 768 is a lower web member 770 and an upper web member 772, which define an open slot 774 through which the resilient arm 714 is received (see FIG. 27B discussed later).

Figure 27E:
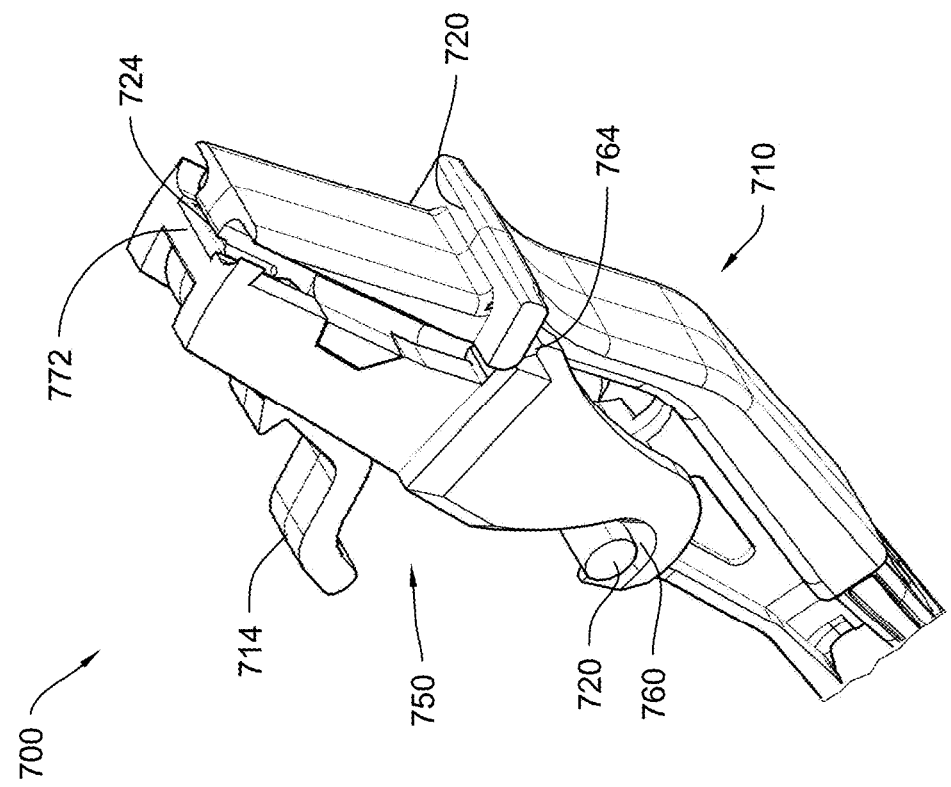
Figure 27D:
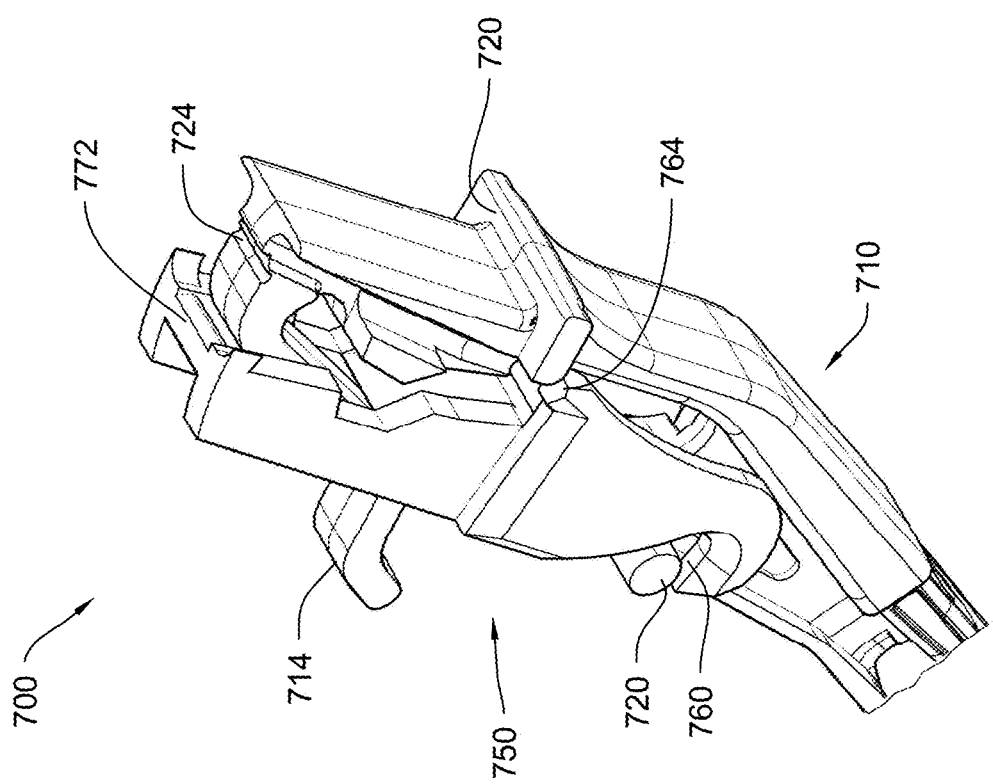
Figure 28:
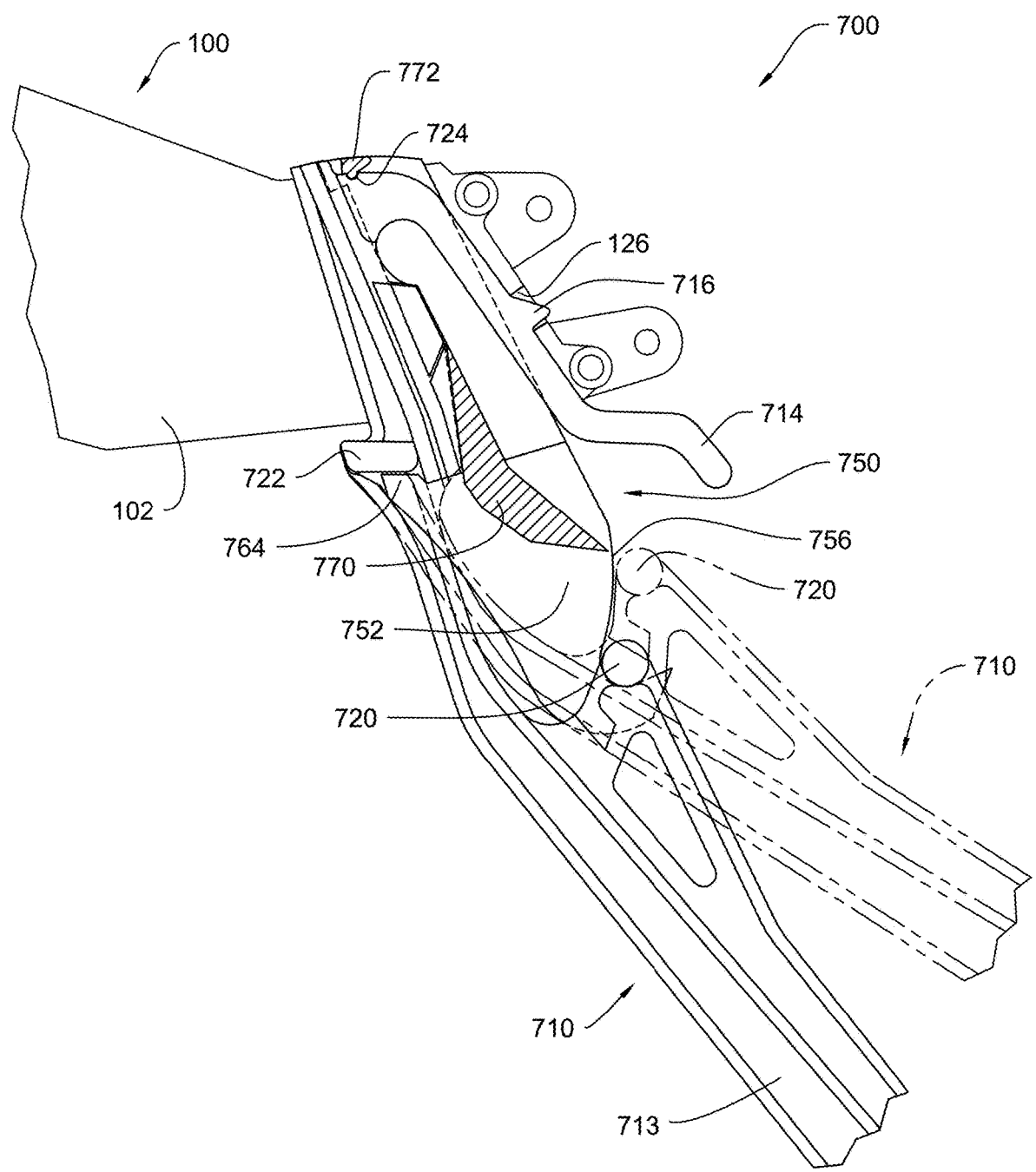
FIG. 28 is a partial cross-sectional view of the reversible seed trench appurtenance of FIG. 23 showing the seed trench appurtenance flexing with respect to the coupling member retained within the mounting bracket.

FIGS. 27A-27E illustrate the steps for attaching the appurtenance 710 to the coupling member 750. First, the upper portion of the coupling member 750 is rotated rearwardly (i.e., toward the tail end of the appurtenance 710) such that the body of the appurtenance 710 may be received between the ears 752, 754 with the hooks 760, 762 extending forward of the appurtenance 710 in order to permit the end of the downturned arm 714 to be aligned with the open slot 774 in the coupling member 750. Referring to FIG. 27C, the coupling member 750 is then rotated toward the upper portion 712 of the appurtenance 710 such that the downturned arm 714 extends through the open slot 774 and permitting the hooks 760, 762 to align with the transverse post 720. Referring to FIGS. 27D-27E, the upper end of the coupling member 750 is further rotated toward the upper portion 712 of the appurtenance until the upper web member 772 engages with or snaps into an upper notch 724 at the upper end of the downturned arm 714 (FIG. 27E), and the forwardly projecting legs 764, 765 abut the underside of the forwardly projecting shelf 722. It should be appreciated that the appurtenance 710 is thus securely retained within the coupling member 750. The upper portion 712 of the appurtenance 710, together with the upper end of the coupling member 750 are then inserted from below into the through-opening 122 of the mounting bracket 100 (see FIG. 24) until the rearwardly projecting arm tab 716 engages with or snaps into the transverse slot 120 of the mounting bracket and the forwardly projecting shelf 722 abuts the lower end of the mounting bracket 100, thus preventing the appurtenance 710 and coupling member 750 from moving upwardly with respect to the mounting bracket 100 during operation. To release the appurtenance 710 and coupling member 750 from the mounting bracket 100, the downturned arm 714 is depressed (i.e., pushed forwardly toward the body of the appurtenance 710) until the arm tab 716 disengages from the transverse slot 126 of the mounting bracket 100, thus permitting the appurtenance 710 and the coupling member 750 to be pulled downwardly together and removed from the through-opening 122 of the mounting bracket 100.

When in use, the trailing portion 713 of the appurtenance 710 is biased downwardly within the trench by the bending or flexing of the resilient neck portion of the resilient appurtenance 710. In the event the appurtenance 710 encounters rocks, abrupt elevation changes or other obstacles while traveling in the forward direction of travel, the appurtenance 710 will flex or bend upwardly (as shown in phantom lines in FIG. 28) forcing the post 720 to ride upwardly along the arcuate lobes 756, 758. Once the obstruction is passed, the bias of the bending neck portion returns the trailing portion 713 to its normal operating position with the post 720 received within the hooks 760, 762. In the event the planter is reversed without first raising the row unit 10 above the soil, the trailing portion 713 will tend to dig or plow into the soil which will exert a downward force on the trailing portion 713 such that it will try to rotate forwardly (i.e. in the clockwise direction as viewed in FIG. 28). However, the hooks 760, 762 receiving the post 720 will resist that forward rotation force keeping the trailing portion 713 in place. In the event the trailing portion 713 encounters an immovable object in the soil, such as a large rock, while being reversed, the trailing portion 713 is reinforced by having post 720 engage with hooks 760, 762 to provide additional rigidity to trailing portion 713. Alternatively, trailing portion 713 is capable of rotating upwardly with the post 720 riding upwardly along the arcuate lobes 756,758 preventing damage to the appurtenance 710 and/or the bracket 100.

Figure 29:
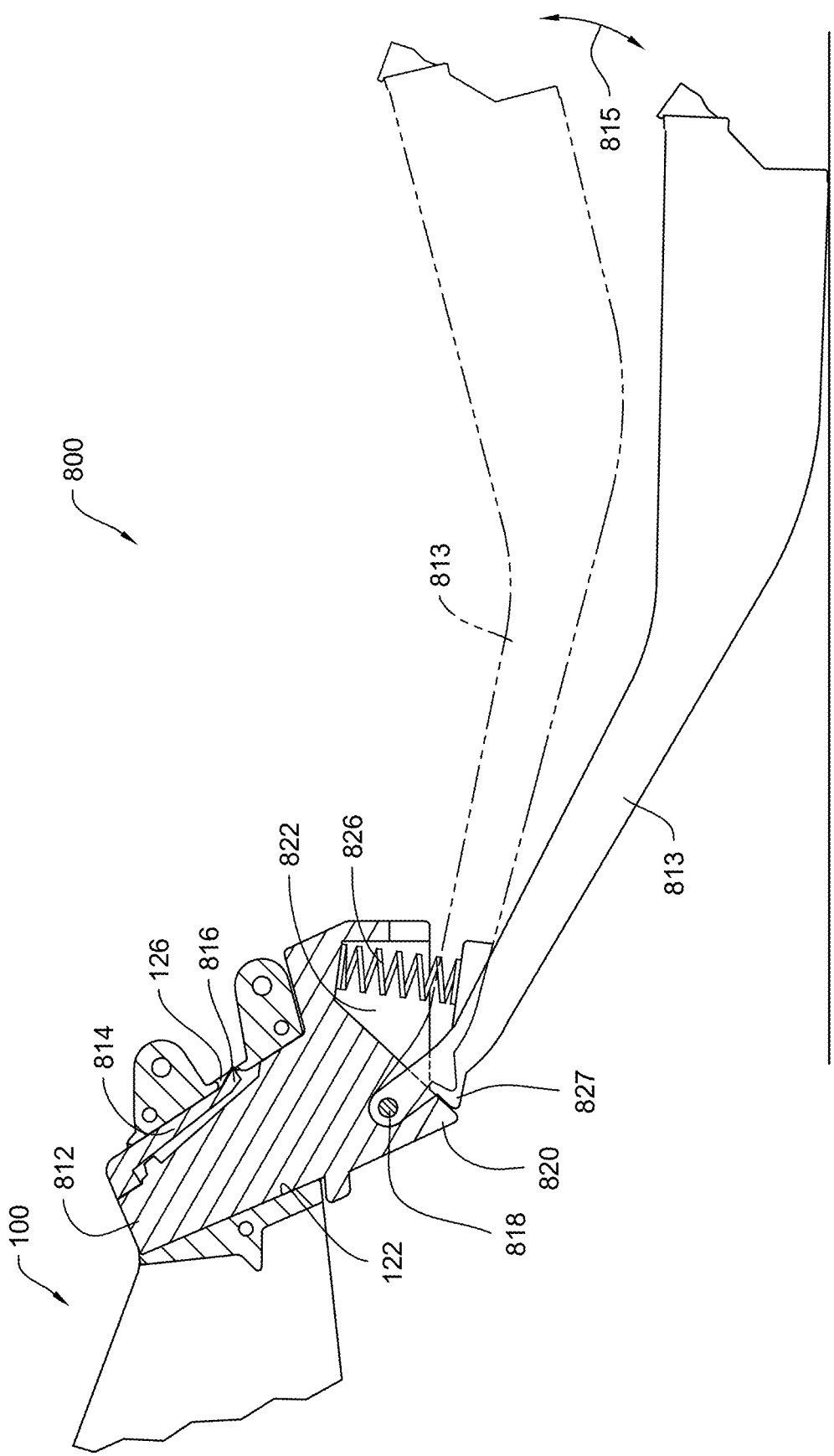
FIG. 29 is a side elevation view in partial cross-section of another embodiment of a reversible seed trench appurtenance.

Another embodiment of a reversible seed trench appurtenance assembly is shown in FIG. 29, designated generally by reference number 800. In this embodiment, the reversible seed trench appurtenance assembly 800 utilizes the same mounting bracket 100 as described above. The seed trench appurtenance 810 includes an upper portion 812 and a trailing portion 813. The trailing portion 813 is pivotally attached to the upper portion 812 as described later. The upper portion 812 is retained by the mounting bracket 100. The trailing portion 813 may be any desired configuration of a seed firmer, seed rebounder or seed deflector that extends into the seed trench.

The configuration of the upper portion 812, is similar to the upper portion 512 of the previous embodiment 500 described above, in that the upper portion 812 is sized to be received into the through-opening 122 from the underside of the bracket 100 and includes a similar resilient arm 814 with a rearward projecting arm tab 816, whereby as the upper portion 812 is pushed into the through-opening 122, the resilient arm 814 is forced inwardly (forwardly) until the rearward projecting arm tab 816 snaps outwardly (rearwardly) upon alignment with the transverse slot 126 of the bracket 100, thus securely fixing the upper portion 812 within the bracket 100, while also being removable from the bracket 100 by depressing the resilient arm 814 to release the arm tab 816 from the transverse slot 126 of the bracket 100 allowing the upper portion 512 to be pulled downwardly and removed from the through-opening 122.

The trailing portion 813 of the appurtenance 810 is pivotally secured to the upper portion 812 by a pin 818 received within a hub 820 of the upper portion 812, thus allowing the trailing portion 813 to pivot upwardly and downwardly (as indicated by arrow 815) with respect to the upper portion 812 about the pin 818. The upper portion 812 includes a recess 822 which retains a biasing element 826, such as a spring in compression, to bias the trailing portion 813 downwardly toward the soil. The trailing portion 813 may be resilient similar to appurtenances 210, 310 described in embodiments 200, 300 or the trailing portion 813 may be rigid similar to the trailing portions 513 of the assembly 500 described above. A suitable stop member 827 is provided to prevent the trailing portion 813 from rotating too far from rotating too far forward (i.e., clockwise as shown in FIG. 29) beyond a predetermined angle with respect to vertical or horizontal. In one embodiment, the stop member 827 may be a projection or shoulder projecting from the trailing portion that abuts a surface of the upper portion 812. In other embodiments, the stop member 827 may be a projection extending downwardly from the upper portion 812 that engages with the trailing portion 813 preventing its forward rotation beyond a predetermined angle with respect to vertical or horizontal.

In embodiments with a rigid appurtenance 810, the downward bias of the biasing element 826 may be sufficiently strong to keep the trailing portion 813 in the normal operating position without pivoting upwardly when the planter is reversed with the row units in the lowered planting position, such that the trailing portion 813 will plow into the soil as the planter is reversed. However, if the rigid trailing portion 813 encounters an obstruction in the soil such as a large rock while being reversed, the rigid trailing portion 813 is capable of pivoting upwardly about the pin 818 when the impact force exceeds the downward bias of the biasing element 826. In other embodiments, whether the appurtenance 810 is rigid or resilient, the bias of the biasing element 826 may be sufficient to ensure the trailing portion 813 applies a sufficient downforce to embed the seeds while traveling in the forward direction, but upon reversal the bias is not so great that the trailing portion 813 is able to pivot upwardly to avoid plowing into the soil or bending.

Figure 30:
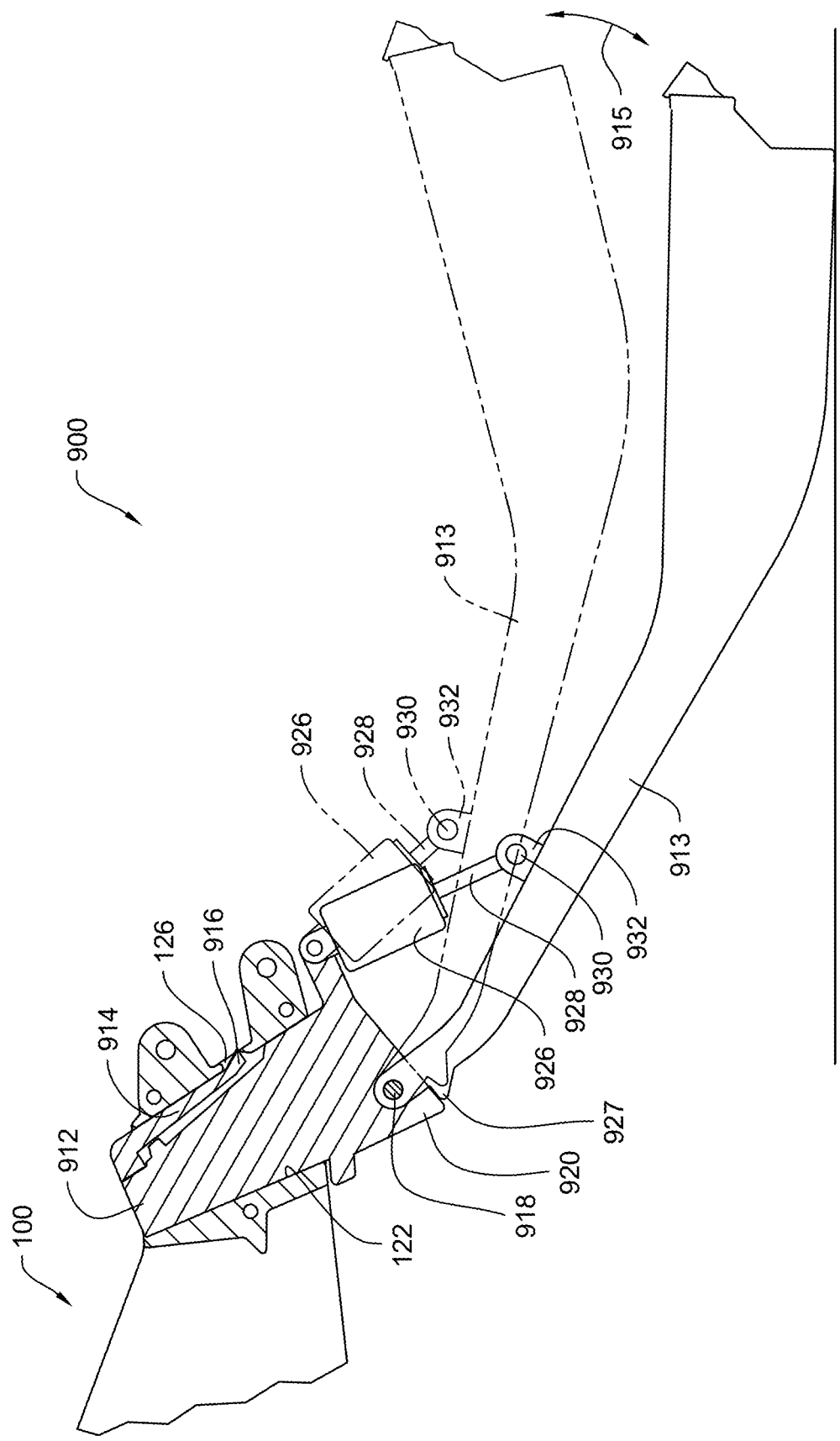
FIG. 30 is a side elevation view in partial cross-section of another embodiment of a reversible seed trench appurtenance.

Another embodiment of a reversible seed trench appurtenance assembly is shown in FIG. 30, designated generally by reference number 900. In this embodiment, the reversible seed trench appurtenance assembly 900 utilizes the same mounting bracket 100 as described above. The seed trench appurtenance 910 includes an upper portion 912 and a trailing portion 913. The upper portion 912 is retained by the mounting bracket 100 and has the same configuration of the upper portion 812 of the previous embodiment 800 described above. The trailing portion 913 is pivotally attached to the upper portion 912 by a pin 918 extending through a hub 920, substantially the same as the prior embodiment 800, thus allowing the trailing portion 913 to pivot upwardly and downwardly (as indicated by arrow 915) with respect to the upper portion 912 about the pin 918. The trailing portion 913 may be resilient similar to appurtenances 210, 310 described in embodiments 200, 300 or the trailing portion 813 may be rigid similar to the trailing portions 513 of the assembly 500 described above. A suitable stop member 927 is provided to prevent the trailing portion 913 from rotating too far forward (i.e., clockwise as shown in FIG. 30) beyond a predetermined angle with respect to vertical or horizontal. In one embodiment, the stop member 927 may be a projection or shoulder projecting from the trailing portion that abuts a surface of the upper portion 912. In other embodiments, the stop member 927 may be a projection extending downwardly from the upper portion 912 that engages with the trailing portion 913 preventing its forward rotation beyond a predetermined angle with respect to vertical or horizontal.

A biasing element 926 is provided to bias the trailing portion 913 downwardly toward the soil. In this embodiment, the biasing element 926 may be a conventional sealed canister shock absorber as is well known in the art. In this embodiment, the upper end of the biasing element 926 is pivotally attached to the upper portion 912 of the appurtenance 910 and the lower end of the spring biased rod 928 is attached to the trailing portion 913 by a pin 930 extending through an ear 932 on the trailing portion 913 of the appurtenance 910. In embodiments with a rigid appurtenance 910, the downward bias of the biasing element 926 may be sufficiently strong to keep the trailing portion 913 in the normal operating position without pivoting upwardly when the planter is reversed with the row units in the lowered planting position, such that the trailing portion 913 will plow into the soil as the planter is reversed. However, if the rigid trailing portion 913 encounters an obstruction in the soil such as a large rock while being reversed, the rigid trailing portion 913 is capable of pivoting upwardly about the pin 918 when the impact force exceeds the downward bias of the biasing element 926. In other embodiments, whether the appurtenance 910 is rigid or resilient, the bias of the biasing element 926 may be sufficient to ensure the trailing portion 913 applies a sufficient downforce to embed the seeds while traveling in the forward direction, but upon reversal the bias is not so great that the trailing portion 913 is able to pivot upwardly to avoid plowing into the soil or bending.

Figure 31:
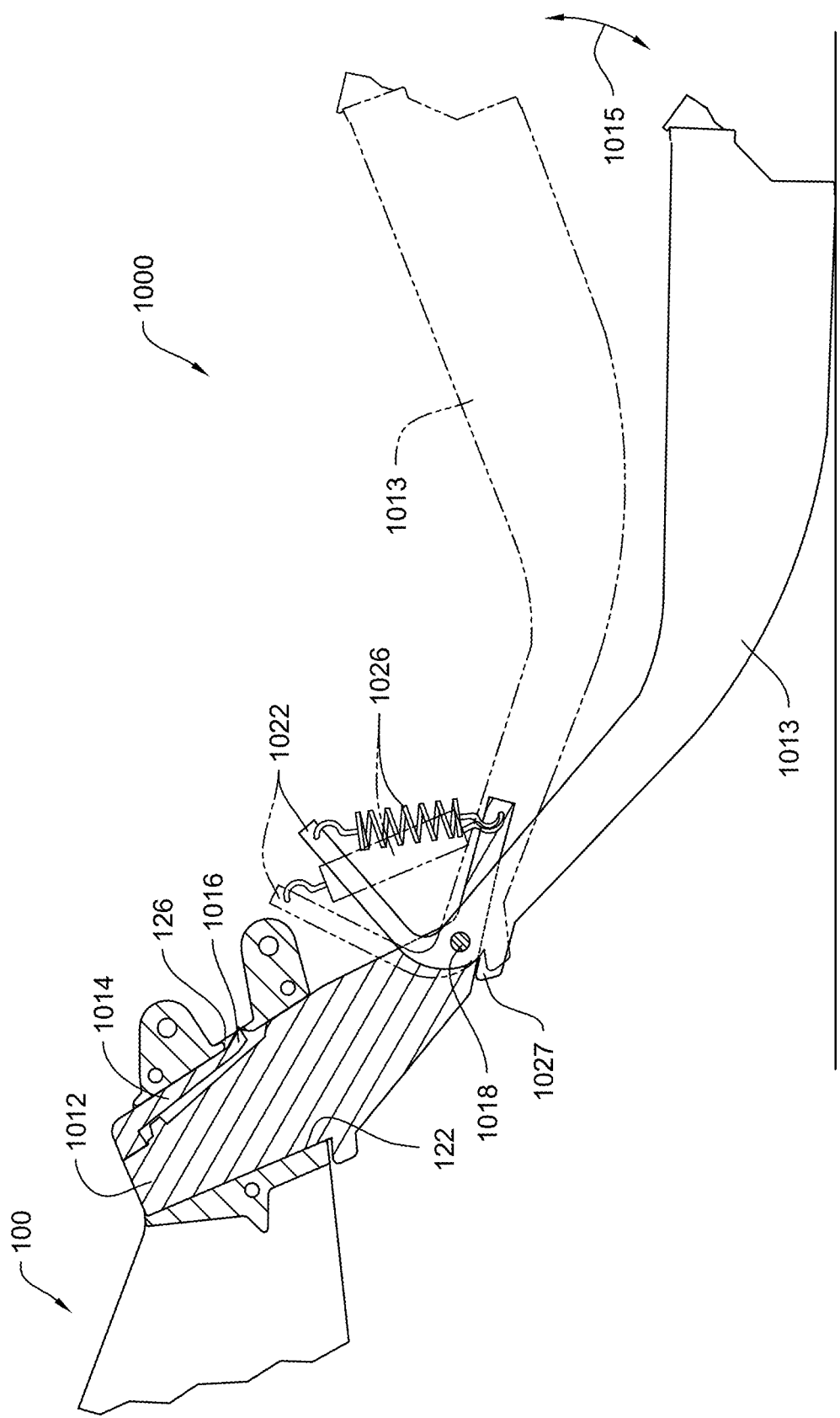
FIG. 31 is a side elevation view in partial cross-section of another embodiment of a reversible seed trench appurtenance.

Another embodiment of a reversible seed trench appurtenance assembly is shown in FIG. 31, designated generally by reference number 1000. In this embodiment, the reversible seed trench appurtenance assembly 1000 utilizes the same mounting bracket 100 as described above. The seed trench appurtenance 1010 includes an upper portion 1012 and a trailing portion 1013. The upper portion 1012 is retained by the mounting bracket 100 and has the same configuration of the upper portion 812 of the previous embodiment 800 described above. However, in this embodiment the upper portion 1012 also includes a downwardly extending dogleg 1020 that projects rearwardly. The trailing portion 1013 of the appurtenance 1010 includes an upper hooked end 1022. A pin 1018 extends through the upper hooked end 1022 and the dogleg 1020, thus allowing the trailing portion 1013 to pivot upwardly and downwardly (as indicated by arrow 1015) with respect to the upper portion 1012 about the pin 1018. The trailing portion 1013 may be resilient similar to appurtenances 210, 310 described in embodiments 200, 300 or the trailing portion 1013 may be rigid similar to the trailing portions 513 of the assembly 500 described above. A suitable stop member 1027 is provided to prevent the trailing portion 1013 from rotating too far forward (i.e., clockwise as shown in FIG. 31) beyond a predetermined angle with respect to vertical or horizontal. In one embodiment, the stop member 1027 may be a projection or shoulder projecting from the trailing portion that abuts a surface of the upper portion 1012. In other embodiments, the stop member 1027 may be a projection extending downwardly from the upper portion 1012 that engages with the trailing portion 1013 preventing its forward rotation beyond a predetermined angle with respect to vertical or horizontal.

A biasing element 1026, such as a tension spring, extends between the hooked end 1022 and the dogleg 1020, thus bias the lower end of the trailing portion 1013 downwardly toward the soil. In embodiments with a rigid appurtenance 1010, the downward bias of the biasing element 1026 may be sufficiently strong to keep the trailing portion 1013 in the normal operating position without pivoting upwardly when the planter is reversed with the row units in the lowered planting position, such that the trailing portion 1013 will plow into the soil as the planter is reversed. However, if the rigid trailing portion 1013 encounters an obstruction in the soil such as a large rock while being reversed, the rigid trailing portion 1013 is capable of pivoting upwardly about the pin 1018 when the impact force exceeds the downward bias of the biasing element 1026. In other embodiments, whether the appurtenance 1010 is rigid or resilient, the bias of the biasing element 1026 may be sufficient to ensure the trailing portion 1013 applies a sufficient downforce to embed the seeds while traveling in the forward direction, but upon reversal the bias is not so great that the trailing portion 1013 is able to pivot upwardly to avoid plowing into the soil or bending.

Figure 32:
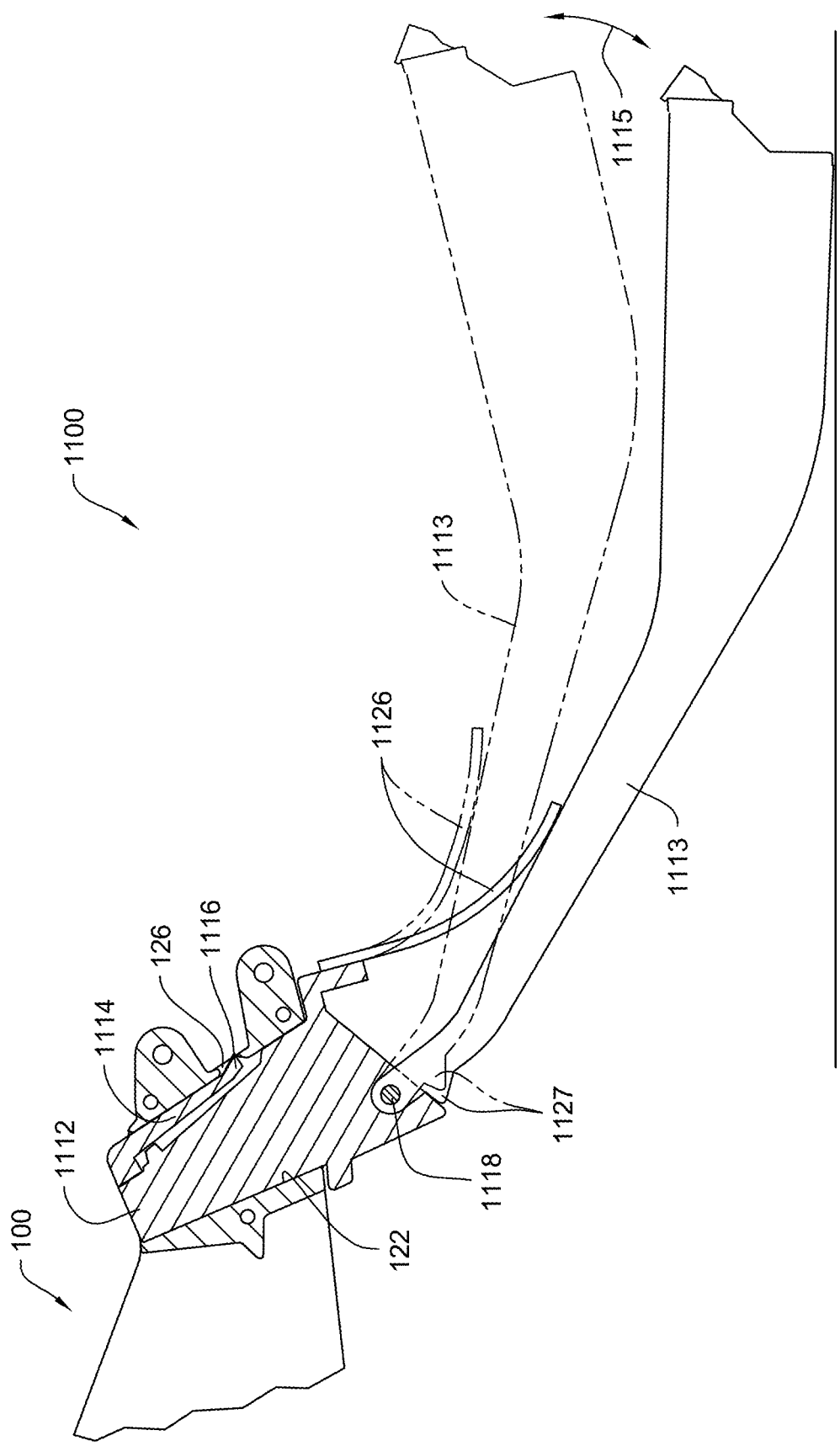
FIG. 32 is a side elevation view in partial cross-section of another embodiment of a reversible seed trench appurtenance.

Another embodiment of a reversible seed trench appurtenance assembly is shown in FIG. 32, designated generally by reference number 1100. In this embodiment, the reversible seed trench appurtenance assembly 1100 utilizes the same mounting bracket 100 as described above. The seed trench appurtenance 1110 includes an upper portion 1112 and a trailing portion 1113. The upper portion 1112 is retained by the mounting bracket 100 and has the same configuration of the upper portion 812 of the previous embodiment 800 described above. The trailing portion 1113 is pivotally attached to the upper portion 1112 by a pin 1118, substantially the same as the prior embodiment 800, thus allowing the trailing portion 1113 to pivot upwardly and downwardly (as indicated by arrow 1115) with respect to the upper portion 1112 about the pin 1118. The trailing portion 1113 may be any desired configuration of a seed firmer, seed rebounder or seed deflector that extends into the seed trench. The trailing portion 1113 may be resilient similar to appurtenances 210, 310 described in embodiments 200, 300 or the trailing portion 1113 may be rigid similar to the appurtenance 510 described in embodiment 500. A suitable stop member 1127 is provided to prevent the trailing portion 1113 from rotating too far forward (i.e., clockwise as shown in FIG. 32) beyond a predetermined angle with respect to vertical or horizontal. In one embodiment, the stop member 1127 may be a projection or shoulder projecting from the trailing portion that abuts a surface of the upper portion 1112. In other embodiments, the stop member 1127 may be a projection extending downwardly from the upper portion 1112 that engages with the trailing portion 1113 preventing its forward rotation beyond a predetermined angle with respect to vertical or horizontal.

A biasing element 1126, such as a leaf spring, is secured at one end to the upper portion 1112. The other end extends downwardly and rearwardly and lies against an upper edge of the trailing portion 1113, thus biasing the rearward end of the trailing portion 1113 downwardly toward the soil. In embodiments with a rigid appurtenance 1110, the downward bias of the biasing element 1126 may be sufficiently strong to keep the trailing portion 1113 in the normal operating position without pivoting upwardly when the planter is reversed with the row units in the lowered planting position, such that the trailing portion 1113 will plow into the soil as the planter is reversed. However, if the rigid trailing portion 1113 encounters an obstruction in the soil such as a large rock while being reversed, the rigid trailing portion 1113 is capable of pivoting upwardly about the pin 1118 when the impact force exceeds the downward bias of the biasing element 1126. In other embodiments, whether the appurtenance 1110 is rigid or resilient, the bias of the biasing element 1126 may be sufficient to ensure the trailing portion 1113 applies a sufficient downforce to embed the seeds while traveling in the forward direction, but upon reversal the bias is not so great that the trailing portion 1113 is able to pivot upwardly to avoid plowing into the soil or bending.

Figure 33:
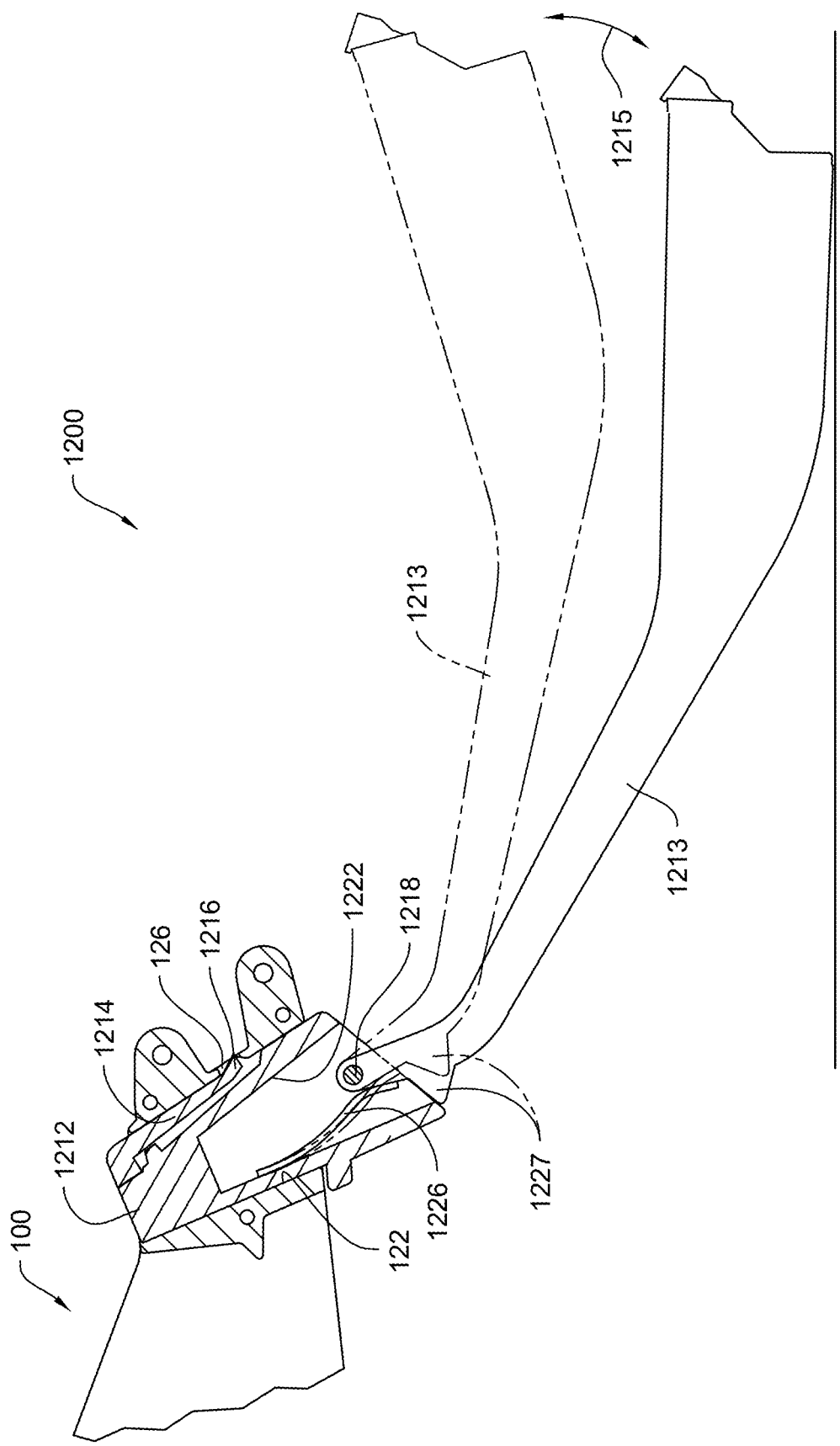
FIG. 33 is a side elevation view in partial cross-section of another embodiment of a reversible seed trench appurtenance.

Another embodiment of a reversible seed trench appurtenance assembly is shown in FIG. 33, designated generally by reference number 1200. In this embodiment, the reversible seed trench appurtenance assembly 1200 utilizes the same mounting bracket 100 as described above. The seed trench appurtenance 1210 includes an upper portion 1212 and a trailing portion 1213. The upper portion 1212 is retained by the mounting bracket 100 and has the same configuration of the upper portion 812 of the previous embodiment 800 described above. The trailing portion 1213 is pivotally attached to the upper portion 1212 by a pin 1218, substantially the same as the prior embodiment 800, thus allowing the trailing portion 1213 to pivot upwardly and downwardly (as indicated by arrow 1215) with respect to the upper portion 1212 about the pin 1218. The trailing portion 1213 may be any desired configuration of a seed firmer, seed rebounder or seed deflector that extends into the seed trench. The trailing portion 1213 may be resilient similar to appurtenances 210, 310 described in embodiments 200, 300 or the trailing portion 1213 may be rigid similar to the appurtenance 510 described in embodiment 500. A suitable stop member 1227 is provided to prevent the trailing portion 1213 from rotating too far forward (i.e., clockwise as shown in FIG. 33) beyond a predetermined angle with respect to vertical or horizontal. In one embodiment, the stop member 1227 may be a projection or shoulder projecting from the trailing portion that abuts a surface of the upper portion 1212. In other embodiments, the stop member 1227 may be a projection extending downwardly from the upper portion 1212 that engages with the trailing portion 1213 preventing its forward rotation beyond a predetermined angle with respect to vertical or horizontal.

A biasing element 1226, such as a leaf spring, is secured at an upper end of the trailing portion 1213 and lies against one wall of a cavity 1222 within the upper portion 1212, thus biasing the rearward end of the trailing portion 1113 downwardly toward the soil. In embodiments with a rigid appurtenance 1210, the downward bias of the biasing element 1226 may be sufficiently strong to keep the trailing portion 1213 in the normal operating position without pivoting upwardly when the planter is reversed with the row units in the lowered planting position, such that the trailing portion 1213 will plow into the soil as the planter is reversed. However, if the rigid trailing portion 1213 encounters an obstruction in the soil such as a large rock while being reversed, the rigid trailing portion 1213 is capable of pivoting upwardly about the pin 1218 when the impact force exceeds the downward bias of the biasing element 1126. In other embodiments, whether the appurtenance 1110 is rigid or resilient, the bias of the biasing element 1226 may be sufficient to ensure the trailing portion 1213 applies a sufficient downforce to embed the seeds while traveling in the forward direction, but upon reversal the bias is not so great that the trailing portion 1213 is able to pivot upwardly to avoid plowing into the soil or bending.

It should be appreciated that in the embodiments 200, 300, 400, 700, 800, 900, 1000, 1100, 1200 the seed trench appurtenances 210, 310, 410, 710, 810, 910, 1010, 1110, 1210 may be flexible or resilient seed firmers, such as the Keeton® seed firmer or SmartFirmer™ available from Precision Planting, or the seed trench appurtenances 210, 310, 410, 710, 810, 910, 1010, 1110, 1210 may be a seed deflector, such as the Rebounder® sold by Schaffert Mfg. Co., 105 D Street, Indianola, N E 69034, or the seed trench appurtenances 210, 310, 410, 710, 810, 910, 1010, 1110, 1210 may be any other appurtenance extending into the seed trench 30. In the embodiments 400, 500, 600, 800, 900, 1000, 1100, 1200 wherein the seed trench appurtenances may be rigid, the appurtenances 410, 510, 610, 810, 910, 1010, 1110, 1210 may have the same configuration as any of the above referenced flexible seed trench appurtenances, including the incorporation of sensors as found in the SmartFirmer™ or other types of appurtenance. Additionally, it should be appreciated that the mounting bracket 100, may have any desired configuration for operably supporting an upper portion of a mating seed trench appurtenance from the shank 14 of the row unit frame 12 or from the seed tube 52 or seed conveyor.

Referring to FIGS. 34-39, the trailing portions 213, 313, 413, 513, 613, 713, 813, 913, 1013, 1113, 1213 of the various embodiments of the seed trench appurtenances 210, 310, 410, 510, 610, 710, 810, 910, 1010, 1110, 1210 may be constructed in two parts; namely a wear resistant, low coefficient of friction, bottom cap member 2000 which removably secures to the body of the trailing portion 213, 313, 413, 513, 613, 713, 813, 913, 1013, 1113, 1213. One non-limiting example of suitable material for the bottom cap member 2000 that is wear resistant and has a low coefficient of friction is ultra-high molecular weight (UHMW) polyethylene. A suitably low coefficient of friction for the bottom cap member 2000 is in the range of less than or equal to 0.3 static and less than or equal to 0.15 dynamic as measured by ASTM D1894.

It should appreciated that because the upper portions of the various seed trench appurtenances 210, 310, 410, 510, 610, 710, 810, 910, 1010, 1110, 1210 described above may have differing configurations, for purpose of this disclosure and drawings of FIGS. 34-39, only the lower part of the trailing portion of the appurtenances is shown. It should also be appreciated that because the trailing portions 213, 313, 413, 513, 613, 713, 813, 913, 1013, 1113, 1213 of the various seed trench appurtenances 210, 310, 410, 510, 610, 710, 810, 910, 1010, 1110, 1210 may have different configurations, only one embodiment of a body member is shown in FIGS. 34-39 which is designated generally be reference number 2010. This representative body member 2010 is intended to be representative of all configurations of the trailing portions 213, 313, 413, 513, 613, 713, 813, 913, 1013, 1113, 1213 identified above.

Figure 35:
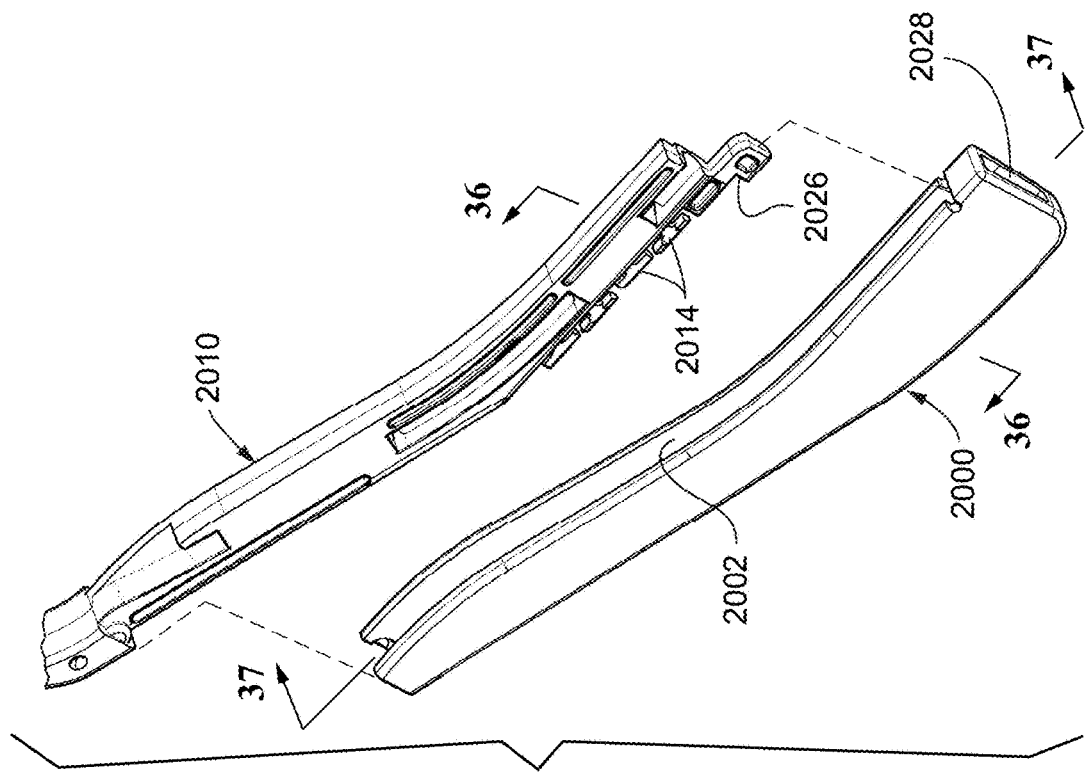
FIG. 35 is an exploded rear perspective view of the seed trench appurtenance of FIG. 34.
Figure 34:
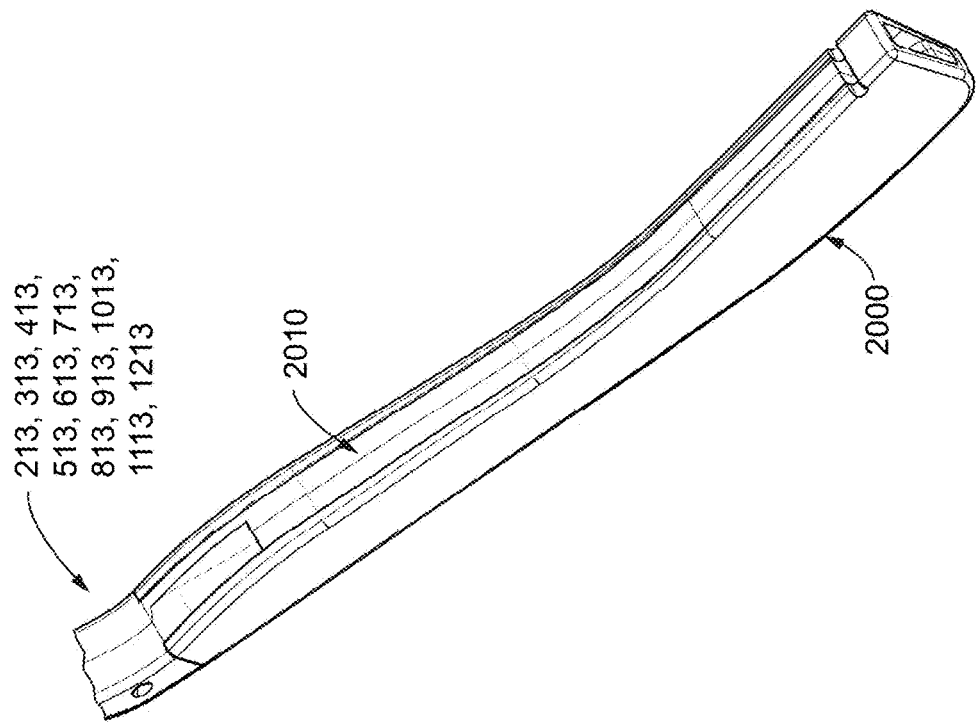
FIG. 34 is a rear perspective view of an embodiment of a trailing portion of the seed trench appurtenances corresponding to any of the prior embodiments incorporating a low-coefficient of friction bottom cap member.
Figure 36:
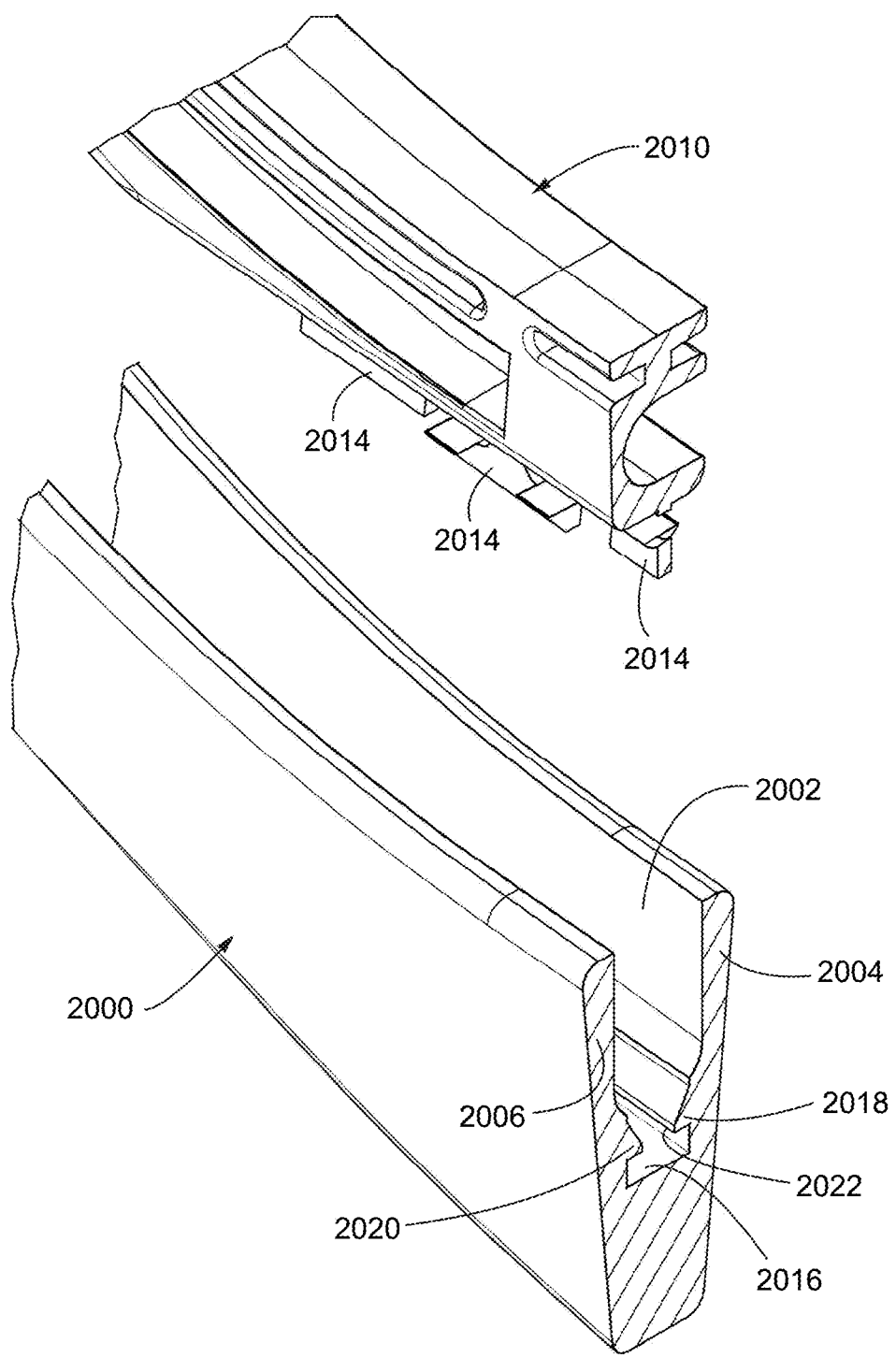
FIG. 36 is an enlarged cross-sectional perspective view as viewed along line 36-36 of FIG. 35.
Figure 37:
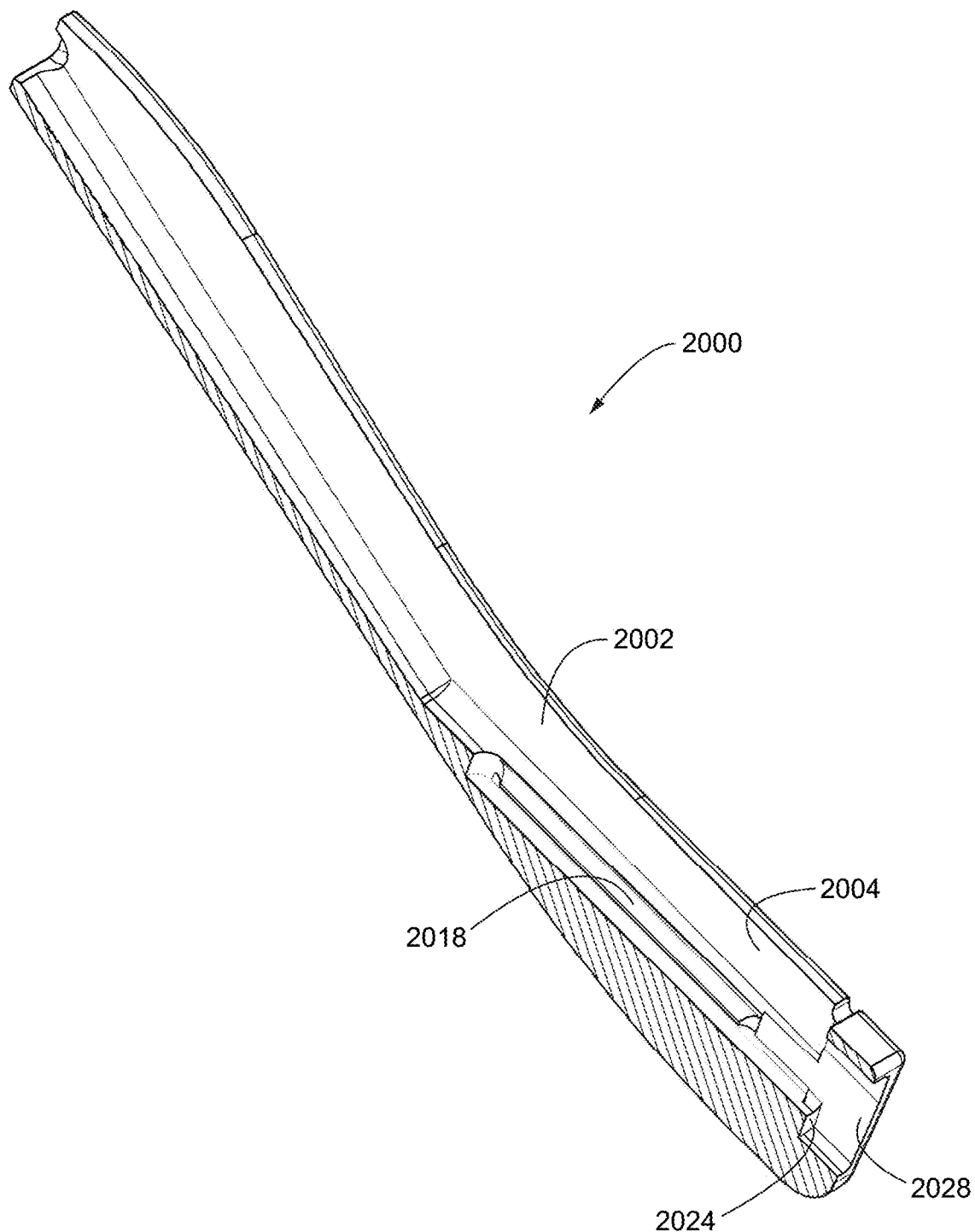
FIG. 37 is a cross-sectional perspective view of the bottom cap member as viewed along line 37-37 of FIG. 35.

As best viewed in FIGS. 35 and 36, the bottom cap member 2000 includes an upper channel 2002 defined by spaced sidewalls 2004, 2006. The body member 2010 is configured to be fixedly, yet removably, received within the channel 2002, such that when the cap member 2000 becomes worn after prolonged use, the worn bottom cap member 2000 can be removed from the body member 2010 and replaced with a new bottom cap member 2000 as needed.

Figure 38:
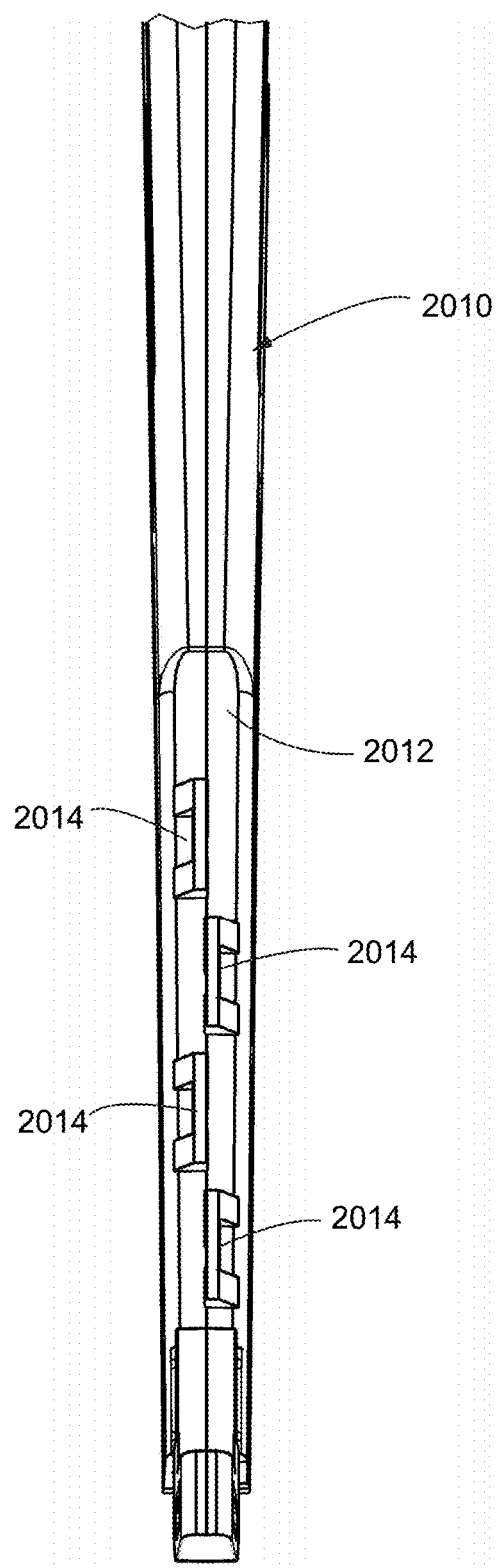
FIG. 38 is a bottom plan view of the seed trench appurtenance of FIG. 34 with the bottom cap member removed.
Figure 39:
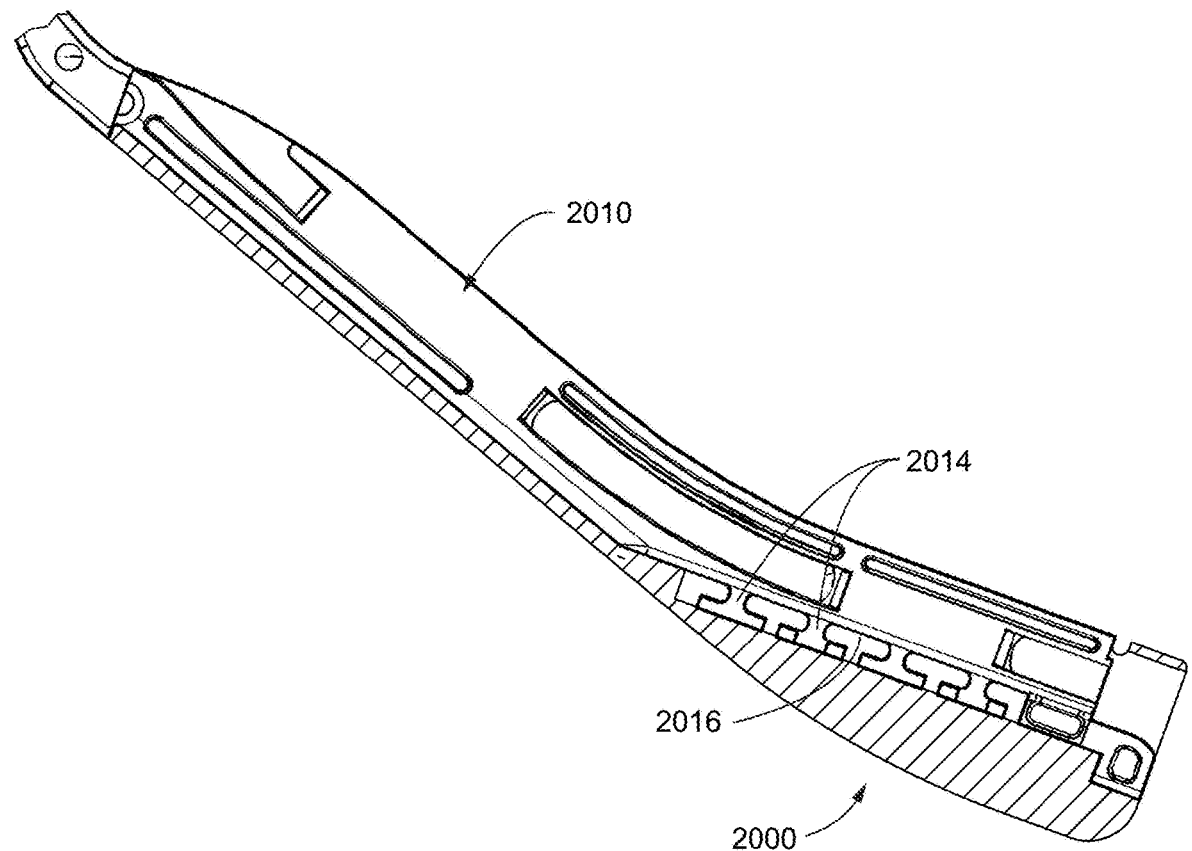
FIG. 39 is a side elevation view of the seed trench appurtenance of FIG. 34 with the bottom cap member shown in cross-section.

As best viewed in FIG. 38, the bottom side 2012 of the body member 2010 includes a plurality of wedge-shaped tabs 2014 oriented in outwardly opposing directions. These wedge-shaped tabs 2014 are configured snap into an inverted T-shaped slot 2016 (FIG. 36) at the bottom of the channel 2002 of the bottom cap member 2000. Just above the T-shaped slot 2016 within the channel 2002, are a pair of inwardly projecting, downwardly sloped flanges 2018, 2020 which define a narrowed neck 2022. When the bottom cap member 2000 and the body member 2010 are aligned and pressed together, the inwardly projecting, downwardly sloped flanges 2018, 2020 engage with the wedge-shaped tabs 2014, forcing the wedge-shaped tabs 2014 inwardly until the wedge shaped tabs 2014 pass the narrowed neck 2022 and snap outwardly into the T-shaped slot 2016, thus securing the bottom cap member 2000 to the body member 2010. A rearward end of the bottom cap member 2000 includes an abutment surface 2024 (FIG. 37) that abuts with an opposing abutment surface 2026 (FIG. 35) of the body member 2010, thus securing the bottom cap member 2000 to the body member 2010 in the fore-and-aft or longitudinal direction. The bottom cap member 2000 may have an open end 2028 (FIGS. 35 and 37) through which the rearward end of the body member 2010 projects or through with delivery tubes may pass for those embodiments of the seed trench appurtenances 210, 310, 410, 510, 610, 710, 810, 910, 1010, 1110, 1210 which include liquid delivery tubes or passages for applying liquid product in the seed trench.

The foregoing description is presented to enable one of ordinary skill in the art to make and use the invention and is provided in the context of a patent application and its requirements. Various modifications to the preferred embodiments of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A reversible seed trench appurtenance assembly for a row unit of an agricultural planter, the row unit having an opening assembly configured to open a seed trench in a soil surface as the row unit advances in a forward direction of travel, the reversible seed trench appurtenance assembly comprising:
   a mounting bracket operably supported by the row unit of the planter;
   a coupling member having a portion received in said mounting bracket and a portion extending below said mounting bracket having ears with arcuate lobes terminating in hooks;
   a seed trench appurtenance having an upper portion and a trailing portion, said upper portion received by said coupling member and said upper portion received within said mounting bracket, said seed trench appurtenance further including a transverse post;
   wherein said seed trench appurtenance is movable between a normal operating position in which said trailing portion extends into the seed trench and a reversing position in which said trailing portion is vertically above said normal operating position;
   whereby in said reversing position, said post engages with said hooks, and;
   whereby when the row unit is reversed in a direction opposite the forward direction of travel, said seed trench appurtenance moves from said normal operating position to said reversing position thereby avoiding damage to the seed trench appurtenance and the mounting bracket.

2. The reversible seed trench appurtenance assembly of claim 1, further comprising:
   a biasing element biasing said trailing portion downwardly in said normal operating position.

3. The reversible seed trench appurtenance assembly of claim 2, wherein said trailing portion is selectively positionable relative to vertical such that said normal operating position of said trailing portion is selectively variable.

4. The reversible seed trench appurtenance assembly of claim 1, wherein said upper portion and said trailing portion are made of a resilient plastic material.

5. The reversible seed trench appurtenance assembly of claim 1, wherein said upper portion is made of a resilient plastic material and said trailing portion is made of rigid material.

6. The reversible seed trench appurtenance assembly of claim 1, wherein said upper portion and said trailing portion are made of rigid material.

7. The reversible seed trench appurtenance assembly of claim 1, wherein said trailing portion comprises a two part assembly, including:
   a body member;
   a bottom cap member removably secured to said body member.

8. The reversible seed trench appurtenance assembly of claim 7, wherein said bottom cap member comprises a wear resistant material having a coefficient of friction between a range of 0.3 static and 0.15 dynamic ASTMD1894 measurement standard.

9. The reversible seed trench appurtenance assembly of claim 8, wherein said wear resistant material is ultra-high molecular weight polyethylene.

10. The reversible seed trench appurtenance assembly of claim 7, wherein an upper end of said bottom cap member includes a channel sized to receive a mating of said body member therein.

* * * * *